US011132993B1

(12) United States Patent
McDaniel et al.

(10) Patent No.: US 11,132,993 B1
(45) Date of Patent: Sep. 28, 2021

(54) DETECTING NON-VERBAL, AUDIBLE COMMUNICATION CONVEYING MEANING

(71) Applicant: Noble Systems Corporation, Atlanta, GA (US)

(72) Inventors: Patrick M. McDaniel, Atlanta, GA (US); Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 324 days.

(21) Appl. No.: 16/404,851

(22) Filed: May 7, 2019

(51) Int. Cl.
*G10L 25/63* (2013.01)
*G10L 15/18* (2013.01)
*G10L 15/02* (2006.01)
*G10L 15/16* (2006.01)
*G10L 15/04* (2013.01)

(52) U.S. Cl.
CPC .......... *G10L 15/1815* (2013.01); *G10L 15/02* (2013.01); *G10L 15/04* (2013.01); *G10L 15/16* (2013.01); *G10L 15/1807* (2013.01); *G10L 25/63* (2013.01)

(58) Field of Classification Search
CPC ....... G10L 125/63; G10L 15/26; G10L 17/00; G10L 15/1807; G10L 15/02; G10L 15/04
See application file for complete search history.

(56) References Cited

U.S. PATENT DOCUMENTS

| 7,606,701 | B2 | 10/2009 | Degani et al. | |
| 9,230,542 | B2 | 1/2016 | Velasco | |
| 10,319,365 | B1* | 6/2019 | Nicolis | ........... G10L 15/26 |
| 10,600,408 | B1* | 3/2020 | Smith | ........... G10L 13/033 |
| 2010/0253689 | A1 | 10/2010 | Dinicola et al. | |
| 2013/0311190 | A1 | 11/2013 | Reiner | |
| 2017/0084295 | A1* | 3/2017 | Tsiartas | ........... G10L 17/02 |

(Continued)

OTHER PUBLICATIONS

M. H. Moattar and M. M. Homayounpour, "A Simple But Efficient Real-Time Voice Activity Detection Algorithm," 17th European Signal Processing Conference (EUSIPCO 2009), Aug. 24-28, 2009.

(Continued)

*Primary Examiner* — Jakieda R Jackson
(74) *Attorney, Agent, or Firm* — Blank Rome, LLP

(57) ABSTRACT

Various embodiments of the invention provide methods, systems, and computer-program products for analyzing an audio to capture semantic and non-semantic characteristics of the audio and corresponding relationships between the semantic and non-semantic characteristics. In particular embodiments, the audio is segmented into a set of utterance segments containing a party speaking on the audio and a set of noise segments containing the party not speaking on the audio. The semantic and non-semantic characteristics are then captured for each of the utterance segments. Specifically, speech analytics is performed on each segment to identify the words spoken by the party in the segment as semantic characteristics. Further, laughter, emotion, and sentence boundary detection is performed on each segment to identify occurrences of such in the segment as non-semantic characteristics. Once identified for each segment, various embodiments of the invention involve constructing a transcript based on the identified semantic and non-semantic characteristics.

21 Claims, 15 Drawing Sheets

(56) References Cited

U.S. PATENT DOCUMENTS

2017/0295240 A1* 10/2017 Sundarababu .......... H04L 69/40
2020/0075040 A1* 3/2020 Provost ................... G06N 3/08

OTHER PUBLICATIONS

L. R. Rabiner and M. R. Sambur, "An Algorithm for Determining the Endpoints of Isolated Utterances," The Bell System Technical Journal, vol. 54, No. 2, Feb. 1975.

Mary Tai Knox and Nikki Mirghafori, "Automatic Laughter Detection Using Neural Networks," Proceedings of the 8th Annual Conference of the International Speech Communication Association (Interspeech 2007), Antwerp, Belgium, pp. 2973-2976.

Peter F. Brown, Peter V. deSouza, Robert L. Mercer, Vincent J. Della Pietra, and Jenifer C. Lai, "Class-Based n-gram Models of Natural Language," Computational Linguistics, vol. 18, No. 4, 1992.

T. Gulzar, A. Singh, and S. Sharma, "Comparative Analysis of LPPC, MFCC and BFCC for the Recognition of Hindi Words using Artifical Neural Networks," Int. Jour. of Computer Appls., vol. 101—No. 12, Sep. 2014.

John Lafferty, Andrew McCallum, and Fernando C.N. Pereira, "Conditional Random Fields: Probabilistic Models for Segmenting and Labeling Sequence Data," Jun. 28, 2001.

Mahwish Pervaiz and Tamin Ahmed Khan, Emotion Recognition from Speech using Prosodic and Linguistic Features, International Journal of Advanced Computer Science and Applications, vol. 7, No. 8, 2016.

Vladimir Chemykh and Pavel Prikhodko, "Emotion Recognition from Speech with Recurrent Neural Networks," https://www.groundai.com/project/emotion-recognition-from-speech-with-recurrent-neural-networks/, Jan. 27, 2017.

K. R. Anne et al., "Chapter 2: Emotion Recognition Using Prosodic Features," Acoustic Modeling for Emotion Recognition, SpringerBriefs in Electrical and Computer Engineering, 2015.

Saif M. Mohammad and Peter D. Turney, "Emotions Evoked by Common Words and Phrases: Using Mechanical Turk to Create an Emotion Lexicon," Proceedings of the NAACL HLT 2010 Workshop, pp. 26-34, Jun. 2010.

Y. Liu, E. Shriberg, A. Stolcke, D. Hillard, M. Ostendorf, and M. Harper, "Enriching Speech Recognition with Automatic Detection of Sentence Boundaries and Disfluencies," IEEE Transactions on Audio, Speech, and Language Processing (vol. 14, Issue 5, 2006).

Simon Graf, Tobias Herbig, Markus Buck, and Gerhard Schmidt, "Features for Voice Activity Detection: A Comparative Analysis," EURASIP Journal on Advances in Signal Processing (2015)2015:91.

Elizabeth Shriberg and Gokhan Tur, "Prosody-Based Automatic Segmentation of Speech into Sentences and Topics," Speech Communication 32(1-2) Special Issueon Accessing Information in Spoken Audio, Sep. 2000.

Mohammad, Saif M., "Sentiment Analysis: Detecting Valence, Emotions, and Other Affectual States from Text, Saif M. Mohammand," Copyright 2014 National Research Council Canada.

Awni Hannun, "Sequence Modeling with CTC," https://distill.pub/2017/ctd, Nov. 27, 2017.

Sergei Lugovic, Marko Horvat, and Ivan Dunder, "Techniques and Applications of Emotion Recognition in Speech," 2016 39th International Convention on Information and Communication Technology, Electronics and Microelectronics (MIPRO), May 30-Jun. 3, 2016.

* cited by examiner

DETECTING NON-VERBAL, AUDIBLE COMMUNICATION CONVEYING MEANING

BACKGROUND

Virtually all automatic speech recognition solutions (products or services) are configured to simply transcribe audio recordings into words. However, words are only the first level of speech understanding. Humans use many other aspects apart from words during conversation to convey information. For example, a speaker may use intonation, emotion, loudness, etc. to convey the intended meaning of a spoken phrase. In some instances, aspects apart from words can even turn a spoken phrase into the opposite meaning, known as sarcasm or irony. Thus, a person listening to another person speaking will generally take all these facets into consideration in processing a spoken phrase to form a meaning of the phrase.

However, conventional speech recognition solutions typically only account for semantics. That is to say conventional speech recognition solutions typically only account for the meaning of words. Therefore, these solutions often miss the true meaning of what is spoken in an audio. In turn, conventional speech recognition solutions can make it difficult to achieve a harmonic and natural human-machine interface for applications relying on voice such as in artificial intelligence applications like Amazon's® Alexia, augmented and virtual reality applications like head-mounted displays ("HMD"), and customer service applications like interactive voice response systems.

Thus, a need in the industry exists for analyzing an audio to capture semantic and non-semantic characteristics in the audio and displaying the semantic and non-semantic characteristics and corresponding relationships between the two to a party who is reviewing the audio (or to a machine that is using the audio as input) so that he or she (or machine) can more fully comprehend the meaning that is actually being conveyed by a party speaking on the audio. It is with respect to these and other considerations that the disclosure herein is presented.

BRIEF SUMMARY

In general, embodiments of the present invention provide computer-program products, methods, systems, apparatus, and computing entities for analyzing an audio to capture semantic and non-semantic characteristics of the audio and corresponding relationships between the semantic characteristics and the non-semantic characteristics. Here, in particular embodiments, the audio is segmented into a set of utterance segments and a set of noise segments by measuring one or more prosodic features of the audio to identify the set of utterance segments comprising segments of the audio containing a party speaking on the audio and the set of noise segments comprising segments of the audio containing the party not speaking on the audio.

Accordingly, in various embodiments, the semantic and non-semantic characteristics are then captured for each of the utterance segments. Specifically, in particular embodiments, this process involves performing speech analytics on an utterance segment to identify the words spoken by the party in the utterance segment. In addition, lexical features are extracted with respect to each of the words spoken by the party in the utterance segment and prosodic features are extracted across the utterance segment with respect to each of the words spoken by the party and each inter-word boundary lying between two consecutive words spoken by the party in the utterance segment.

With respect to the non-semantic characteristics, laughter detection is performed in various embodiments by dividing the utterance segment into a set of overlapping windows comprising feature frames and then, for each of the overlapping windows, using at least some of the prosodic features extracted at locations in the audio corresponding to each of the feature frames in the overlapping window as input to a predictive model to identify whether laughter exists in the utterance segment. For instance, the predictive model may be one or more neural networks.

In addition, emotion detection is performed in various embodiments by comparing each of the words spoken by the party in the utterance segment to an emotion lexicon comprising a list of emotions and words that are indicative of one or more emotions in the list of emotions to identify a first result identifying one or more emotions for at least one of the words spoken by the party in the utterance segment. Emotion detection is further performed by using some of the prosodic features extracted for each of the words spoken by the party in the utterance segment as input to another predictive model to identify a second result identifying one or more emotions identified as being expressed by the party in the utterance segment. Here, the predictive model may be one or more support vector machines. Accordingly, the first and second results are then used as input to an ensemble comprising a predictive model to arrive at a conclusion as to which of the emotions for the first result and the second result is the emotion actually expressed by the party in the utterance segment.

Finally, sentence boundary detection is performed in various embodiments by using the lexical features and some of the prosodic features extracted for each of the words spoken by the party in the utterance segment and each of the inter-word boundaries lying between two consecutive words as input to another predictive model to identify where in the utterance segment a sentence boundary exists with respect to each of the inter-word boundaries lying between two consecutive words. Here, in particular embodiments, the predictive model may be conditional random fields. Furthermore, in particular embodiments, another predictive model may be used to determine whether a particular sentence boundary is associated with a sentence that is a question.

Once the semantic and non-semantic characteristics have been identified for each of the utterance segments, various embodiments of the invention involve constructing a transcript based on the identified characteristics. For instance, in particular embodiments, the transcript identifies the semantic characteristics as the words spoken by the party in the audio and the non-semantic characteristics as occurrences of laughter, emotions, and sentence boundaries. In addition, the corresponding relationships between the semantic characteristics and the non-semantic characteristics are shown in the transcript as locations of the words and the occurrences of laughter, emotions, and sentence boundaries within the audio relative to one another.

For particular applications, the audio may represent a first channel of a conversation that took place between the party and a second party. For example, the conversation may have been a telephone call that took place between an individual who called technical support for a computer company and an agent working in technical support who handled the call for the company. Here, since the audio is for a first channel (e.g., either for the individual or the agent), the audio only has the party's dialogue. That is to say, the audio only has the words spoken by the party. However, a second channel also makes up a part of the conversation and this second channel produces a second audio that has the dialogue for the second party.

Therefore, in various embodiments, the second audio is also processed in a similar manner as the first audio to capture the semantic and non-semantic characteristics of the second audio. Accordingly, a second transcript is constructed for the second audio that identifies the semantic characteristics as the words spoken by the second party in the second audio and the non-semantic characteristics as occurrences of laughter, emotions, and sentence boundaries. Again, the corresponding relationships between the semantic characteristics and the non-semantic characteristics are shown in the second transcript as locations of the words and the occurrences of laughter, emotions, and sentence boundaries within the audio relative to one another. Here, in particular embodiments, a combined transcript may be constructed from the first transcript and the second transcript that represents the conversation that had taken place between the first party and the second party.

In relation to this combined script, various embodiments of the invention involve displaying the combined transcript on a graphical user interface ("GUI") on a computer monitor for a user. In particular embodiments, the GUI provides a timeline representing the conversation that had taken place between the first and second parties. Here, the semantic characteristics may be displayed as the words spoken by the first party and the words spoken by the second party on the GUI at locations with respect to the timeline proximate to a time when the words were spoken by the first party and the second party during the conversation.

In addition, the non-semantic characteristics may be displayed for the first and second parties as a plurality of markers on the GUI in conjunction with the timeline to demonstrate the corresponding relationships between the semantic characteristics and the non-semantic characteristics for the parties. Here, each of the markers represents an occurrence of laugher by the first or second party, an emotion expressed by the first or second party, or a sentence boundary for a sentence spoken by the first or second party. Each marker is displayed on the GUI at a location with respect to the timeline proximate to a time when the occurrence of laugher, the emotion expressed, or the sentence boundary for the sentence took place during the conversation. Accordingly, in various embodiments, the GUI identifies at least one of the first party and the second party as being associated with each marker.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
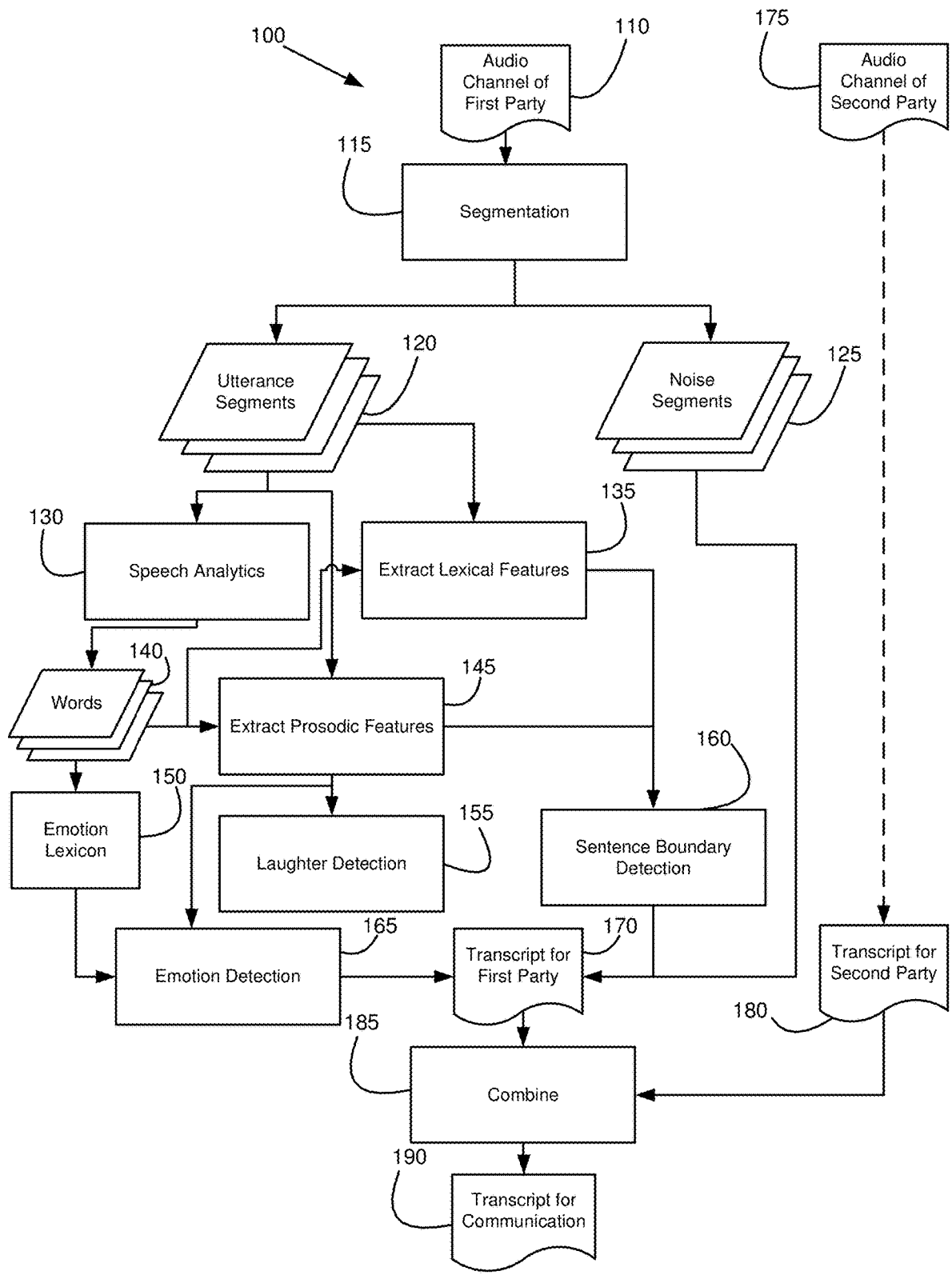
FIG. 1 illustrates a general process flow in accordance with various embodiments of the invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

General Overview

Various embodiments of the invention are concerned with analyzing an audio to capture the semantic and non-semantic characteristics of the audio and displaying such characteristics and the corresponding relationships between the two types of characteristics (e.g., producing a transcript) so that a party reviewing the audio can fully comprehend (get a better understanding of) the meaning of what is actually being conveyed by a party speaking in the audio. The same can be said for a machine that may be using the audio as input. For example, a human machine interface that may be using the audio as input to perform one or more operations. Here, due to conveying the semantic and non-semantic characteristics of the audio to the machine, the machine is able to fully comprehend the meaning of what is actually being conveyed by the party speaking in the audio so that the machine can identify and perform the correct operations.

The disclosure herein discusses the use of various embodiments of the invention to capture and display the semantic and non-semantic characteristics of an audio involving an agent in a contact center conversing with a party on a telephone call. For example, the party may have called a help number for a computer manufacturer to talk to technical support personnel about a problem the party is having with a computer the party recently purchased from the manufacturer. Here, in this example, the audio may be a recording of the telephone call that took place between the party and the technical support personnel and a supervisor may be interested in reviewing a transcript of the telephone call for quality purposes. However, with that said, those of ordinary skill in the art can appreciate in light of this disclosure that various embodiments of the invention may be used in a number of other environments and therefore, the use of embodiments of the invention in a contact center environment should not be construed to limit the scope of the invention.

Turning now to FIG. 1, a general process flow 100 is provided for analyzing an audio to capture the semantic and non-semantic characteristics of the audio of a telephone call in a contact center and producing a transcript conveying the semantic and non-semantic characteristics of the audio and corresponding relationships between the two types of characteristics. Here, the audio of the conversation that took place during the telephone call was recorded using two separate channels. The first channel was used for the agent and contains the audio of the agent. The second channel was used for the party and contains the audio of the party. Therefore, the first step of the process 100 is performing segmentation 115 on the audio of a first party (e.g., the agent) for one of the channels 110.

Here, segmentation involves segmenting the audio of the channel 115 into segments containing utterances and segments containing noise. An utterance segment involves a segment during the audio when the first party (e.g., agent) was speaking. For example, the agent may have answered the phone call by saying "hello, how may I be of help to you today?" This particular phrase (sentence) spoken by the agent may be identified as an utterance segment for the audio. In contrast, a noise segment involves a segment during the audio when the first party is not speaking. However, background noise may still be picked up on the audio.

The segmentation of the audio into utterance and noise segments may involve measuring various features of the audio signal to identify the different segments found in the audio depending on the embodiment. For instance, in particular embodiments, segmentation may involve framing the audio and measuring three different features per frame to determine whether the frame contains voice or noise. For example, as explained further herein, the three different features that may be used are short-term energy, spectral flatness measure, and frequency corresponding to the maximum value of the spectrum magnitude. These features are applied in parallel in particular embodiments to detect voice activity. The result is the identification of a set of utterance segments 120 and a set of noise segments 125 for the audio channel. At this point, the set of utterance segments 120 is used to identify various semantic characteristics, such as the words spoken in the segments, and non-semantic characteristics, such as emotions, laughter, and sentence boundaries found in the segments.

Specifically, speech analytics 130 is performed on each of the utterance segments to identify the words 140 spoken by the first party (the word sequence) in the particular utterance. In these instances, a number of different analytics approaches may be employed. For example, the process 100 may make use of one or more of a phonetics approach, large-vocabulary continuous speech recognition (LVCSR) approach, and/or direct phrase recognition approach in performing voice analytics on communications. In addition, other lexical features are extracted 135 for each of words 140 found in the utterances. For instance, in particular embodiments, word features such as different lengths of N-grams and/or different positional information of words 140 for a location are determined. In addition, a tagger may be used to identify the part of speech ("POS") for each word 140 found in an utterance. Finally, word class labels may be induced from bigram word distributions. Here, in particular embodiments, the process 100 involves using statistical algorithms for assigning words 140 to classes based on the frequency of their co-occurrence with other words.

Further, prosodic features are extracted 145 from the words and inter-word boundaries of the segment in various embodiments. Generally speaking, prosodic features are those elements of speech that are not individual phonetic segments (vowels and consonants) but are properties of syllables and larger units of speech (suprasegmental). Prosodic features may reflect various characteristics of a speaker such as, for example, the emotional state of the speaker, the form of an utterance (whether a statement, question, or command), the presence of irony or sarcasm, and emphasis, contrast, and focus. Prosodic features are normally identified as either an auditory measure or an acoustic measure.

An auditory measure represents a subjective impression produced in the mind of the listener. Popular variables in auditory terms include the pitch of the voice, length of sounds, loudness, and timbre. While an acoustic measure represents a physical property of the sound wave that are typically measured objectively. Popular variables in acoustic terms include fundamental frequency, duration, intensity, and spectral characteristics.

Here, in various embodiments, the extracted prosodic features are used along with the extracted lexical features to identify non-semantic characteristics found in the audio of the party 110. For instance, in particular embodiments, the lexical features and prosodic features extracted from words and inter-word boundaries are used to detect sentence boundaries within the audio of the party 110. As is discussed further herein, sentence boundary detection 160 is performed by using the lexical and prosodic features as inputs for one or more predictive models that identify whether an utterance segment includes some type of sentence boundary between two words found in the segment. In addition, in particular embodiments, laughter detection 155 is performed by using prosodic features as inputs for one or more predictive models that predict whether an utterance segment includes laughter.

Furthermore, emotion detection 165 is performed in particular embodiments by using prosodic features extracted from the words 140 as input to one or more predictive models to identify emotions expressed by the speaker in the audio 100. Here, the words 140 are also compared to an emotion lexicon 150 to identify emotions expressed by the speaker in the audio 110. As discussed further herein, the emotion lexicon 150 is a list of emotions and words that are indicative of each emotion. The results of applying the words 140 to the emotion lexicon 150 are provided as another input in the emotion detection process 165. Accordingly, emotions are identified in the audio 110 based on a combination of the results of comparing the words 140 with the emotion lexicon 150 and the results of applying one or more predictive models to the prosodic features of the words 140. Thus, in particular embodiments, the results of analyzing the words 140 for a particular utterance segment may result in identifying an emotion that is conveyed by the party speaking in the segment.

Once the semantic (words) and non-semantic (emotions, laughter, and sentence boundaries) characteristics have been captured for the audio channel of the first party 110, the process 100 continues by producing a transcript for the audio of the first party 170 based on the captured characteristics of the audio channel 110. Here, the semantic and non-semantic characteristics and corresponding relationships between the two are assembled to produce a transcript 170 of the audio channel 110 that can then be used to better illustrate the meaning of what the party was conveying in the audio 110.

For instance, in particular embodiments, the semantic and non-semantic characteristics may be displayed to a third party who may be interested in reviewing the transcript 170. For example, the transcript 170 may be displayed as text along a timeline representing what was spoken by the first party (e.g., the agent) during the conversation. In addition, symbols representing different non-semantic characteristics may be displayed along the timeline in conjunction with the text to indicate when such characteristics occurred. For example, the first party may have commented during the audio "I just cannot believe it" and a happy face icon may be displayed along with this text in the transcript at a particular location on the timeline to indicate the first party (e.g., agent) expressed the emotion happy at that instance during the conversation when he or she commented "I just cannot believe it."

Accordingly, the same or similar process 100 is carried out for the other audio channel 175 involved in the conversation for the second party (e.g., the party on the call with the contact center agent) to capture the semantic and non-semantic characteristics for the audio of the second party. As a result, a transcript for the second party 180 is produced displaying the semantic and non-semantic characteristics captured in the audio channel for the second party 175 and the corresponding relationships between the two. Finally, the transcripts for both of the parties 170, 180 are combined 185 to produce a transcript for the entire communication 190 having the semantic and non-semantic characteristics for both parties. Such a transcript may then be used by an individual or a machine in many instances and applications to more fully comprehend (get a better understanding of) the actual meaning of what was conveyed by the two parties during the conversation.

For example, the transcript may be displayed to an individual for review and allow the individual who is reviewing the transcript to see the entire exchange between the first and second parties during the conversation along with the semantic and non-semantic characteristics and the corresponding relationships between the two for both parties to get a better understanding of the actual meaning of what was conveyed by the two parties during the conversation. For instance, the first party may comment "I just cannot believe it." Here, if the individual was reviewing a conventional transcript that only provided the phrase (only provided the semantic characteristics), then the individual would likely have to assume (guess) as to what the first party actually meant by the comment. For example, was the comment made by the first party as a happy statement or as an angry statement? In some instances, the individual may be able to deduct from other statements made by the first party in the transcript, but not always. Other instances may be a closer call when the emotion being expressed by the first party is similar to another emotion such as, for example, sad and anger.

The same can be said for determining the form of a statement made by the first party. For example, the first party may comment "your wife signed up for this already." Here, if transcript only provides the words (only provides the semantic characteristics), then the individual may not be able to decipher whether the first party made a statement or asked a question. Therefore, the transcript would be much more helpful to the individual in understanding what the first party was actually conveying if the transcript included punctuation. That is to say, if the transcript displayed the statement as "your wife signed up for this already?" Thus, various embodiments of the invention are concerned with analyzing an audio to capture the semantic and non-semantic characteristics of the audio and displaying such characteristics and the corresponding relationships between the two types of characteristics (e.g., producing a transcript) so that a party reviewing or a machine using the audio (the transcript of the audio) can more fully comprehend (get a better understanding of) the meaning of what is actually being conveyed by a party speaking in the audio.

Exemplary Architecture for Contact Center

Figure 2:
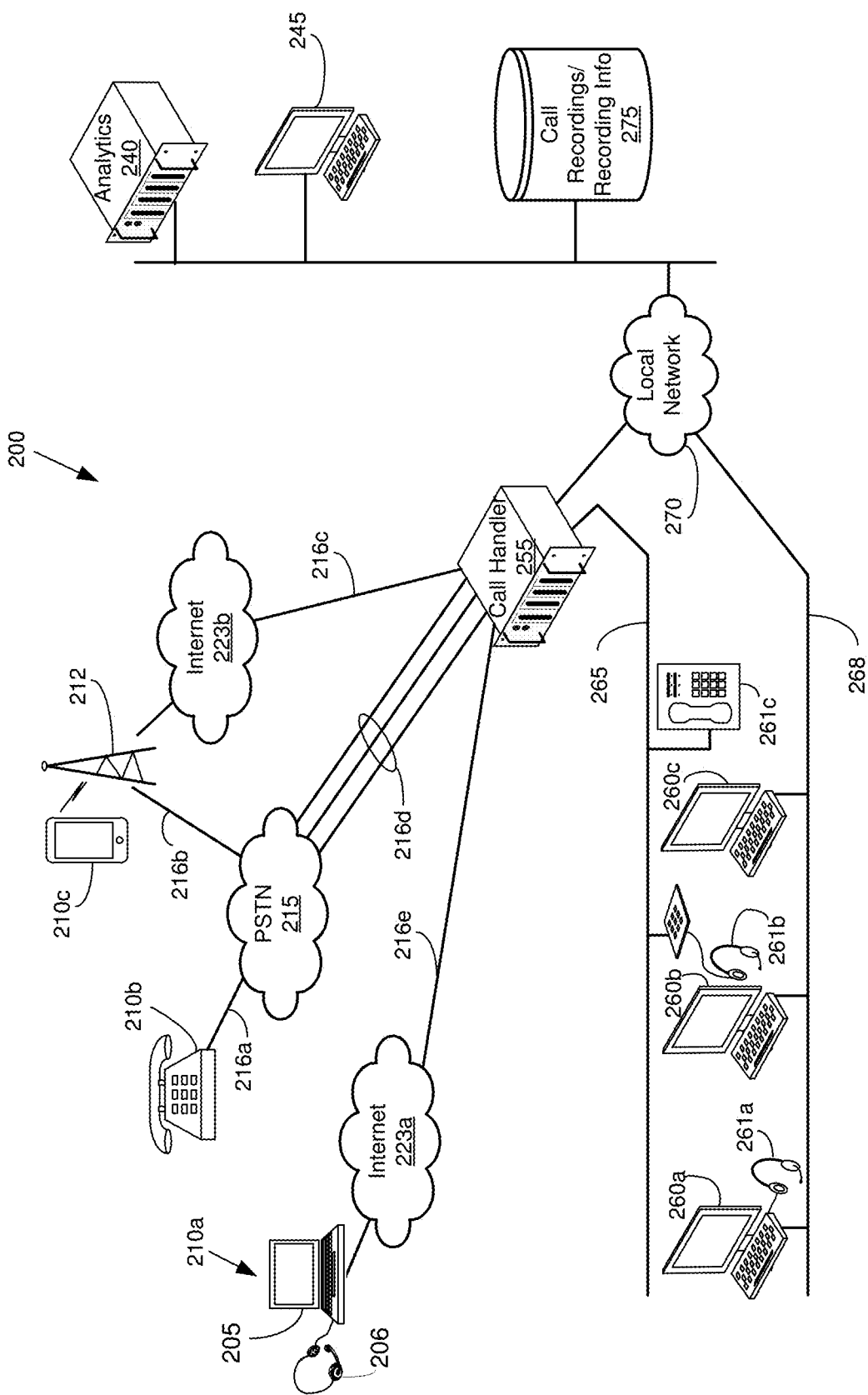
FIG. 2 illustrates an architecture that may be employed in practicing various embodiments of the invention.

As previously mentioned, the disclosure herein discusses the use of various embodiments of the invention to capture and display the semantic and non-semantic characteristics of an audio involving an agent in a contact center conversing with a party on a telephone call. With this in mind, FIG. 2 illustrates a contact center architecture 200 that may be used in accordance with the various technologies and concepts disclosed herein. The contact center architecture 200 shown in FIG. 2 may process voice communications and non-voice communications that are inbound-only, outbound-only, or a combination of both (sometimes referred to as a "blended" contact center).

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, inbound voice calls can originate from calling parties using a variety of different phone types. For instance, a calling party may originate a call from a conventional analog telephone 210b connected to a public switched telephone network ("PSTN") 215 using an analog plain old telephone service ("POTS") line 216a. The calls may be routed by the PSTN 215 and may comprise various types of facilities 216d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 210c, such as a smart phone, tablet, or other mobile device, which wirelessly communicates with a mobile service provider ("MSP") 212. The voice calls may be routed to the PSTN 215 using an integrated services digital network ("ISDN") interface 216b or other types of interfaces that are well known to those skilled in the art. In particular embodiments, the MSP 212 may also route calls as packetized voice, referred to herein as voice-over-IP ("VoIP") to an Internet provider 223*b* using Internet-based protocols, such as SIP or H.323 protocols. For convenience, unless indicated otherwise, the term "trunk" refers to any type of facility 216*c*, 216*d*, 216*e* providing voice calls to, or from, the contact center, regardless of the type of protocol or technology used. Specifically, a "trunk" is not limited to time-division multiplexing ("TDM") technology, but could refer to various VoIP communication channels.

Inbound voice calls may also originate from a calling party employing a so-called "IP phone," "VoIP phone," or "soft phone" 210*a*. In particular embodiments, this device may comprise a computing device 205, such as a laptop, computing tablet, or other electronic device, which may interface with a headphone/microphone combination, also referred to as a "headset" 206. An IP phone may use a digital voice control protocol and may process packetized voice data according to various Internet based voice protocols, such as session initiated protocol ("SIP") and the call may be conveyed by an Internet provider 223*a*. Those skilled in the art will recognize that a variety of Internet Protocols ("IP") and facilities may be used to convey voice calls.

The term "voice call" may encompass a voice call using any form of currently available technology and/or originating from any type of device, such as a soft phone 210*a*, a conventional telephone 210*b*, a mobile phone 210*c*, or other device known in the art. The term "call" as used herein may encompass an active instance of two-way communication, an attempt to establish two-way communication, or a portion of the two-way communication. For example, a user at a conventional telephone 210*b* can dial a voice call in an attempt to establish two-way communication, and a call can be said to exist even prior to establishment of the two-way connection.

In various embodiments, inbound voice calls from calling parties to the contact center may be received at a call handler 255, which can be, for instance, an automatic call distributor ("ACD"). In particular embodiments, the call handler 255 may be a specialized switch for receiving and routing inbound calls under various conditions. Further, the call handler 255 may be embodied as a dedicated form of equipment readily available from various manufacturers, or the call handler 255 may be a so-called "soft switch" comprising a suitable programming module executed by a processing device to perform the necessary specialized functions. The call handler 255 may route an incoming call over contact center facilities 265 to a phone device used by an available agent for servicing. Depending on the embodiment, the facilities 265 may be any suitable technology for conveying the call, including but not limited to a local area network ("LAN"), wide area network ("WAN"), ISDN, or conventional TDM circuits. In addition, the facilities 265 may be the same or different from the facilities used to transport the call to the call handler 255.

The physical area at which an agent sits is often referred to as an agent "position" and these positions are often grouped into clusters managed by a supervisor, who may monitor calls and the agents' productivity. An agent typically uses a specially configured computing device 260*a*-260*c*, such as a computer with a display, and a voice device 261*a*-261*c* that is adapted for various contact center functions associated with processing communications. For instance, the voice device 261*a*-261*c* may be a soft phone device exemplified by a headset 261*a* connected to the computer 260*a*. Here, the soft phone device may be a virtual telephone implemented in part by an application program executing on the computer 260*a*. Further, the phone may also comprise an Internet Protocol ("IP") based headset 261*b* or a conventional phone 261*c*. Use of the term "phone" is intended to encompass all these types of voice devices used by an agent, unless indicated otherwise.

The combination of computing device 260*a*-260*c* and voice device 261*a*-261*c* may be referred to as a "workstation." Thus, for these particular embodiments, the workstation collectively has a data capability and a voice capability, although separate devices may be used. Here, data may be provided to an agent's workstation computer 260*a*-260*c* over facilities 268 along with routing the call to the agent's workstation voice device 261*a*-261*c* over other facilities 265. In some instances, "workstation" may be used in reference to either the data or voice capability at the agent's position. For example, "routing a call to the agent's workstation" means routing a call to the voice device 261*a*-261*c* at the agent's position. Similarly, "routing a call to the agent" means routing a call to the appropriate equipment at an agent's position. The workstation typically has a display provided via a computer monitor. This is used to convey information to the agent about the calls, and the agent may interact with the call handler 255 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the call handler 255 to allow the contact center (including the call handler 255) to know which agents are available for handling calls. In particular embodiments, the call handler 255 may also maintain data on an agent's skill level that may be used to route a specific call to the agent or group of agents having the same skill level. The call handler 255 may also know what types of channels and combinations of channels the agent can handle.

Accordingly, in various embodiments, the call handler 155 may place a call in a queue if there are no suitable agents available to handle the call, and/or the call handler 255 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 275 to retrieve or provide information for processing the call. In other configurations, the IVR may be used to only provide announcements.

Depending on the embodiment, the interactions between the various components shown may involve using a local area network ("LAN") 270. However, other configurations are possible, such as, but not limited to, using a wide area network, wireless network, router, bridge, direct point-to-point links, etc. Furthermore, in lieu of using facilities 265 directly linked to the call handler 255 for conveying audio to the agents, other facilities 268 associated with the LAN 270 may be used.

In addition to receiving inbound communications, the contact center may also originate communications to parties, referred to herein as "outbound" communications. For instance, in particular embodiments, the call handler 255 may be a dialer, such as a predictive dialer, that originates outbound calls at a rate designed to meet various criteria. Here, the call handler 255 may include functionality for originating calls, and if so, this functionality may be embodied as a private automatic branch exchange ("PBX" or "PABX"). In addition, the call handler 255 may directly interface with voice trunks using facilities 216c, 216d, 216e to the PSTN 215 and/or Internet provider 223a, 223b for originating calls. After the calls are originated, the call handler 155 may perform a transfer operation to connect the calls with agents, a queue, or an IVR. Furthermore, in various embodiments, the call handler 255 may make use of one or more algorithms to determine how and when to dial a list of numbers so as to minimize the likelihood of a called party being placed in a queue while maintaining target agent utilization.

In various embodiments, the call handler 255 determines which agent is authorized and available to handle a call upon being made aware of the call, and thereafter appropriately coordinates any response to the call. In addition, the call handler 255 may also make use of one or more schemes in allocating calls to agents such as, for example, on a round-robin basis, a least-number-served basis, a first available agent basis, and/or a seniority basis.

Furthermore, in various embodiments, the contact center architecture 200 includes one or more analytics components 240. As further described herein, the analytics component(s) 240 are configured to perform some type of analytics on the audio of a call to identify different semantic and non-semantic characteristics for the agent and remote party on the call. Furthermore, the analytics component(s) are configured in particular embodiments to construct a transcript of an audio (e.g., a telephone call) displaying the identified semantic and non-semantic characteristics. Accordingly, call recordings may be stored in some type of data store (non-volatile storage media) 275 along with information on each of the recordings. Further, the contact center architecture 200 may include some type of monitoring workstation 245 that may be used by an individual (a supervisor) to review recordings and transcripts made of recordings.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the call handler 255 or other component may be combined into a single hardware platform executing one or more software modules.

In addition, the contact center architecture 200 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 2 represents one possible configuration of a contact center architecture 200, and that variations are possible with respect to the protocols, facilities, components, technologies, and equipment used. Furthermore, those skilled in art will recognize FIG. 2 represents one possible configuration of a contact center architecture 200, and that variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Audio Analytics Module

Figure 3:
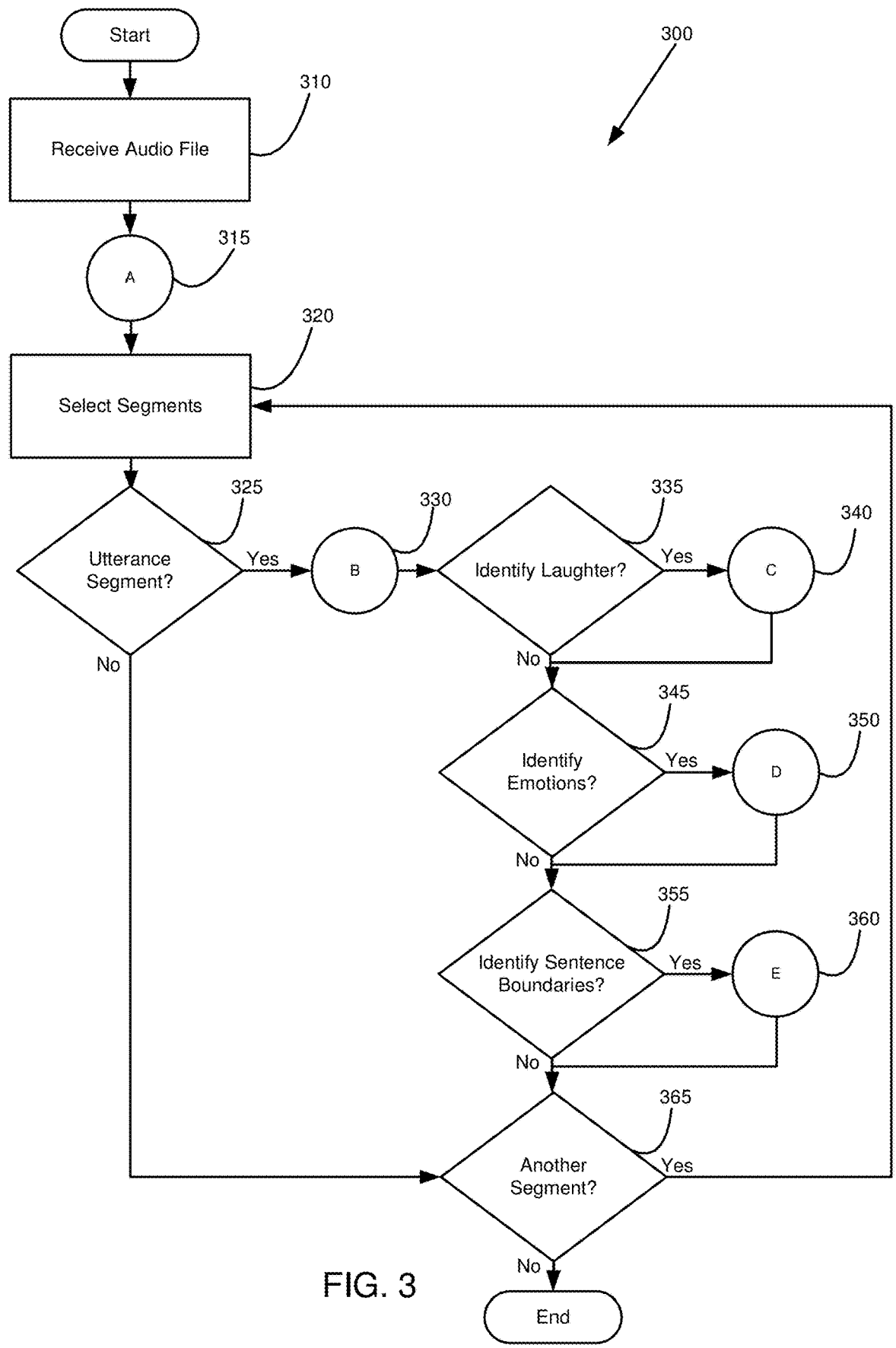
FIG. 3 illustrates a process flow for analyzing an audio to capture semantic and non-semantic characteristics in the audio in accordance with various embodiments of the invention.

Turning now to FIG. 3, additional details are provided regarding a process flow that may be used in analyzing an audio to capture semantic and non-semantic characteristics of the audio in accordance with various embodiments of the invention. Specifically, FIG. 3 is a process flow carried out by an audio analytics module for performing such functionality according to various embodiments of the invention. For example, the process flow shown in FIG. 3 may also correspond to operations carried out by a processor in a component, such as an analytics component 240 described above with respect to the contact center architecture 200, as it executes the audio analytics module stored in the component's volatile and/or nonvolatile memory.

The process 300 begins with the audio analytics module receiving an audio file in Operation 310. As previously discussed, this audio file may be a single channel of audio from a telephone call fielded by an agent of the contact center. For instance, the audio file may be retrieved by the audio analytics module from some type of data store 275 at the request of an individual who is working on a monitoring workstation 245 within the contact center. While in another instance, the audio analytics module may be invoked by some automated process that involves recording the audio of a telephone call as it is taking place and then invoking the audio analytics module to identify the semantic and non-semantic characteristics of the audio once the telephone call has completed.

The audio analytics module initially segments the audio file into a set of utterance segments and a set of noise segments in Operation 315. As previously discussed, an utterance segment involves a segment of the audio file in which the party associated with the file (e.g., the agent or remote party the agent is talking with) is actually speaking. While a noise segment involves a segment of the audio file in which the party is not speaking. Thus, the audio file is likely to include a segment of the party speaking, followed by a segment when the party is not speaking, followed by another segment of the party speaking, and so forth as the party conducts a back-and-forth dialogue with the other party on the telephone call.

Again, since the audio file is composed of only one channel, background noise is all that is normally heard when the party is not speaking. That is to say, while the party is quiet and listening to the other party on the call speak, all that can be heard on the party's channel is any background noise that may be captured by the party's telephone device while he or she is listening.

Accordingly, the audio analytics module makes use of voice activity detection (VAD) to identify the set of utterance segments and the set of noise segments for the audio file in various embodiments. The primary difference between different VAD algorithms is the features used to detect voice activity. Among all the features, the most widely used have been short-term energy and zero-crossing rate because of their simplicity. However, these features are known to degrade by environmental noise. Therefore, other features such as autocorrelation function-based features, spectrum-based features, Mel-frequency cepstral coefficients, and delta line spectral frequencies have been used in VAD.

With this in mind, the audio analytics module performs the segmentation of the audio file in particular embodiments by invoking a segmentation module. As discussed further herein, the segmentation module performs VAD on the audio file and records different segments identified in the file with respect to time and whether such segments are utterance segments or noise segments.

At this point, the audio analytics module analyzes the utterance segments of the audio file to identify various semantic and non-semantic characteristics of the segments. Therefore, in FIG. 3, the audio analytics module selects a segment in Operation 320. Accordingly, in various embodiments, the audio analytics module performs this operation by selecting the segments in chronological order with respect to time, beginning with the first segment identified for the audio file.

Upon selecting a segment, the audio analytics module determines whether the segment has been marked as being a segment containing an utterance in Operation 325. If not (if instead the segment has been marked as containing noise), then the audio analytics module simply ignores the segment and selects the next segment for the audio file.

However, if instead the audio analytics module determines the selected segment is marked as an utterance, then the audio analytics module extracts features from the segment in Operation 330. Depending the embodiment, the extracted features include spoken words, lexical, and/or prosodic features that can then be used to identify semantic and non-semantic characteristics of the audio file. Accordingly, the audio analytics module performs the feature extraction in particular embodiments by invoking an extraction module.

Once the features have been extracted from the utterance segment, then the audio analytics module determines whether to identify if laughter is contained within the segment in Operation 335. If so, then the audio analytics module determines whether the utterance segment contains laughter in Operation 340. Here, the audio analytics module performs this operation in particular embodiments by invoking an identify laughter module. As discussed further herein, the identify laughter module makes use of prosodic features from the utterance segment and applies a predictive model to the prosodic features to determine whether or not the segment contains laughter. If the identify laughter module determines the segment does contain laughter, then the module records such information for the utterance segment.

Next, the audio analytics module determines whether to identify any emotions for the selected utterance segment in Operation 345. If so, then the audio analytics module determines whether the speaker in the utterance segment expresses any type of emotion in Operation 350. The audio analytics module performs this operation in particular embodiments by invoking an identify emotions module.

As discussed further herein, the identify emotions module identifies emotions expressed by the speaker in the utterance segment based on a combination of words spoken and prosodic features found in the segment. Here, the identify emotions module applies an emotion lexicon to the words spoken in the segment, applies a predictive model to the prosodic features of the segment, and then combines the results of both to identify emotions expressed by the speaker in the utterance segment. Similar to the identify laughter module, if the identify emotions module determines the speaker expresses an emotion in the segment, then the identify emotions module records such information for the utterance segment.

Next, the audio analytics module determines whether to identify any sentence boundaries that may be present in the utterance segment in Operation 355. If so, then the audio analytics module determines whether any sentence boundaries are found within the words (text) of the utterance segment in Operation 360. The audio analytics module performs this operation in particular embodiments by invoking an identify sentence boundaries module. Like the identify emotions module, the identify sentence boundaries module identifies sentence boundaries that lie within the utterance segment. Specifically, the identify sentence boundaries module makes use of both lexical features and prosodic features, applies a decision tree to the lexical features, and then applies a predictive model to the results of the decision tree and the extracted prosodic features to identify sentence boundaries within the utterance segment. The identify sentence boundaries module then records any boundaries identified for the utterance segment.

At this point, the audio analytics module determines whether another segment exists for the audio file in Operation 365. If so, then the audio analytics module returns to Operation 320 and selects the next segment for the audio file. The module then repeats the same operations described above for the newly-selected segment. Once the audio analytics module has processed all of the segments, the process 300 ends.

At this point, several semantic and non-semantic characteristics and corresponding relationships between the two for the audio file have been identified and recorded. Accordingly, these identified semantic and non-semantic characteristics can then be used for various applications in which an accurate understanding of what is being conveyed by the party speaking in the audio may be of importance. For example, the monitoring of a communication taking place in a contact center for quality control purposes when an understanding of what is actually being conveyed by a party, the agent who is handling the communication or the remote party on the communication, is crucial in measuring the performance of the agent.

Segmentation Module

Figure 4A:
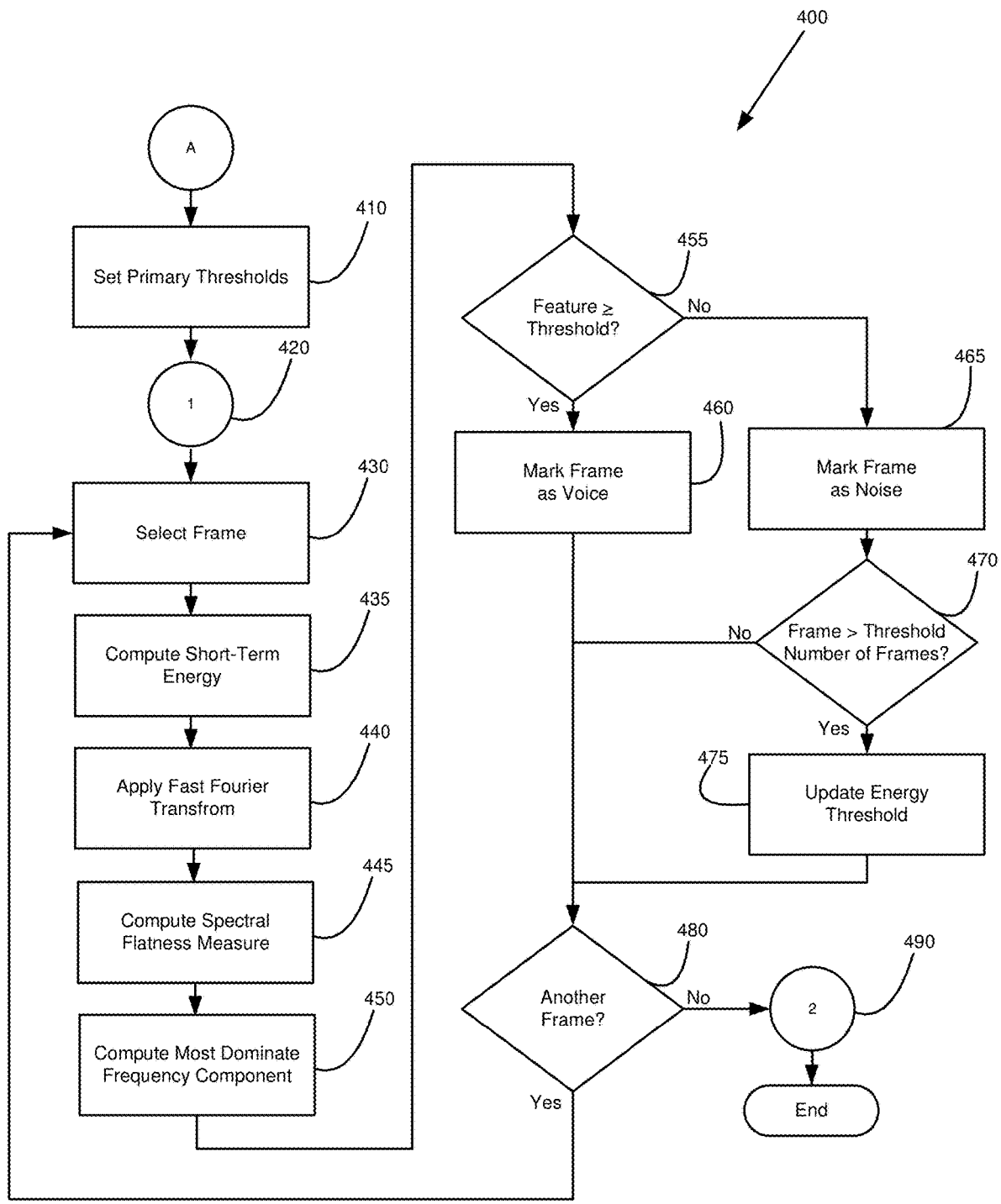
FIGS. 4A-4C illustrate a process flow for segmenting an audio into utterance segments and noise segments in accordance with various embodiments of the invention.
Figure 4B:
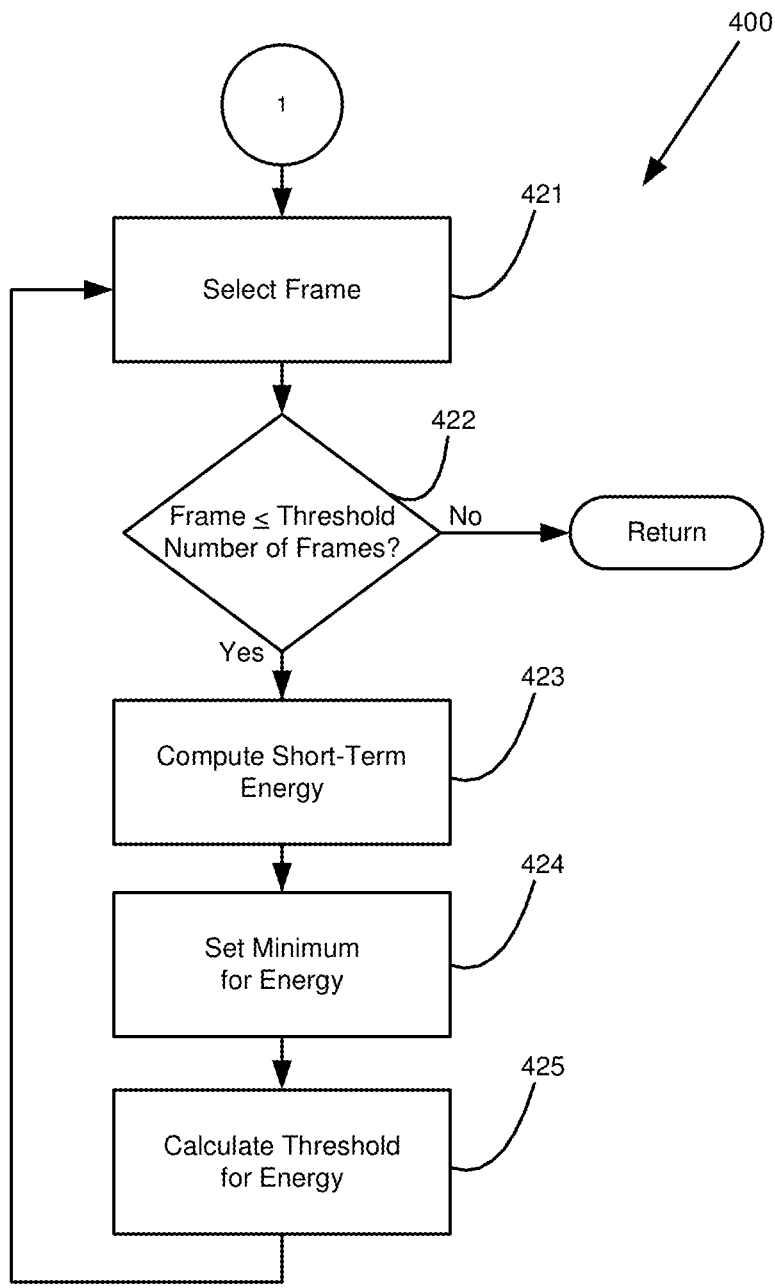
Figure 4C:
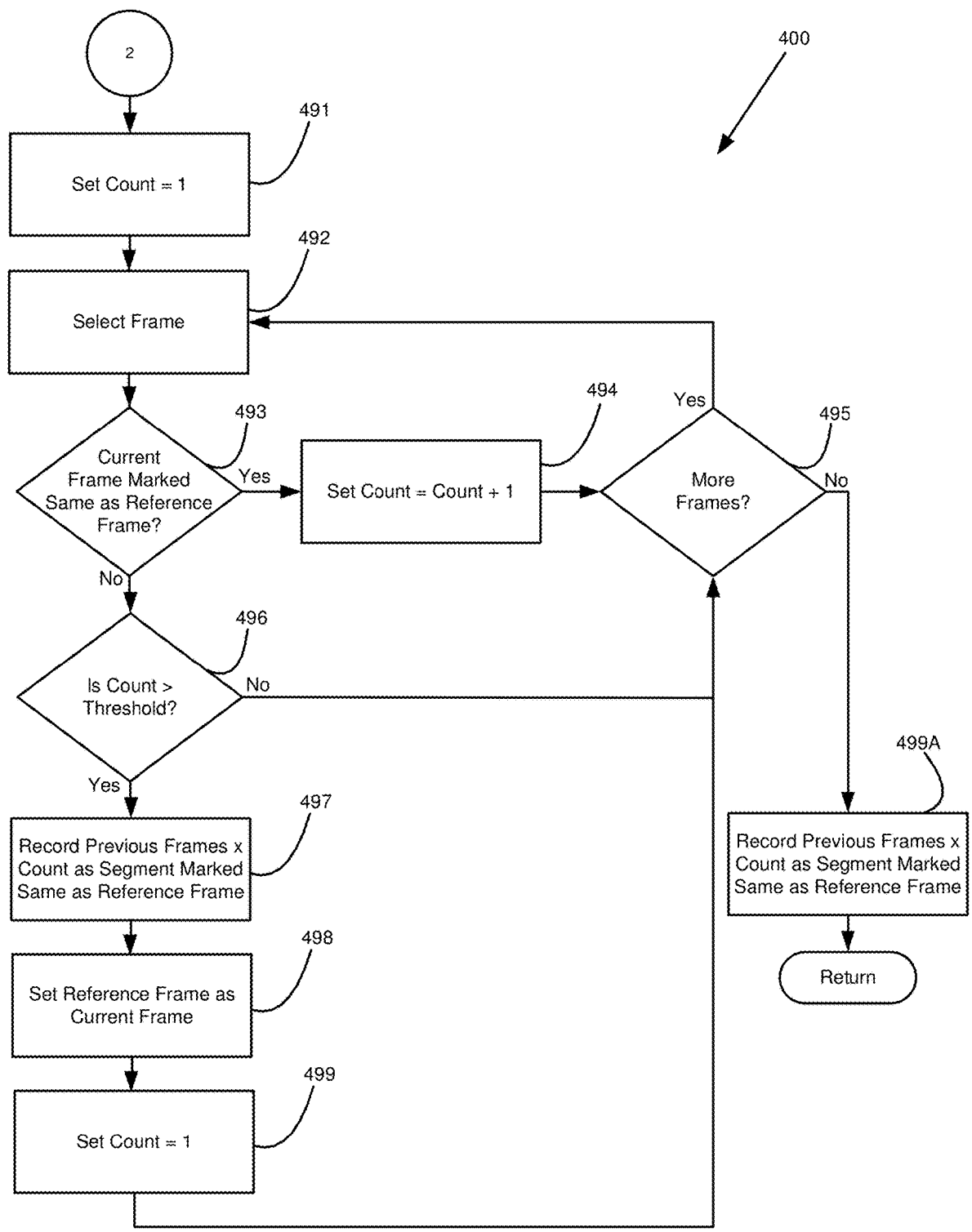

Turning now to FIGS. 4A-4C, additional details are provided regarding a process flow for segmenting an audio into a set of utterance segments and a set of noise segments in accordance with various embodiments of the invention. Specifically, FIGS. 4A-4C are a process flow carried out by a segmentation module for performing such functionality according to various embodiments of the invention. For example, the process flow shown in FIGS. 4A-4C may also correspond to operations carried out by a processor in a component, such as an analytics component 240 described above with respect to the contact center architecture 200, as it executes the segmentation module stored in the component's volatile and/or nonvolatile memory.

As the reader may recall, the segmentation module is invoked by the previously-discussed audio analytics module in various embodiments to segment an audio. However, with that said, in other embodiments, the segmentation module may be invoked by a different module or may be invoked as a stand-alone module.

Here, three features are used to perform VAD on the audio (audio signal) in various embodiments. The first of these features is short-term energy (STE). The amplitude of an audio signal varies with time. Therefore, a convenient representation that reflects these amplitude variations is the STE of the signal. However, a concern is that this feature tends to lose its efficiency in noisy conditions, especially in lower signal-to-noise ratios. Therefore, two additional features are calculated in the frequency domain. The first of these features is spectral flatness measure (SFM). Spectral flatness is a measure of the noisiness of the spectrum and has proven to be effective in VAD. This feature is calculated using the following equation:

$$SFM_{db} = 10\ \log_{10}(G_m | A_m)$$

Where $A_m$ and $G_m$ are arithmetic and geometric means of the speech spectrum respectively. The other feature is the most dominate frequency component of the speech frame spectrum (F). This feature can be computed by finding the frequency corresponding to the maximum value of the spectrum magnitude, $|S(k)|$. Accordingly, these three features are applied in parallel to detect voice activity.

Turning now to FIG. 4, the process 400 begins with the audio analytics module setting primary thresholds for each of the three features in Operation 410. Each primary threshold defines a level at which a measurement of a corresponding feature is found to identify audio containing an utterance. Here, each of the primary thresholds may be initially determined in various embodiments based on a finite set of clean validation speech signals. Once set, the audio analytics module may then use these as fixed variables.

Next, the segmentation module frames the audio signal. Framing involves dividing the audio signal into certain windows of time. For instance, the audio analytics module in particular embodiments divides the audio signal into frames of 10 milliseconds with no overlap. The audio analytics module then uses a number of frames from the beginning of the signal for threshold initialization for the STE in Operation 420. For example, the first thirty frames (equally 300 milliseconds) may be used for threshold initialization because at least some of these frames are assumed to contain no speech (silence).

Thus, turning briefly to FIG. 4B, the segmentation module selects the first frame of the audio file in Operation 421. Next, the segmentation module determines whether the selected frame is within the range of frames to be used to set the initial threshold for STE in Operation 422. For example, the segmentation module determines whether the selected frame is within the first thirty frames. If so, then the segmentation module computers the STE for the selected frame in Operation 423. Next, the segmentation module sets the minimum value for the STE in Operation 424. Here, the segmentation module determines whether the computed STE for the currently selected frame is the minimal STE encountered for the range of frames thus far. If so, then the segmentation module sets the minimum for STE to the computed STE for the currently selected frame. Finally, the segmentation module calculates the initial threshold for STE in Operation 425. Specifically, in various embodiments, the segmentation module calculates the initial threshold for STE as the primary STE threshold*log of the minimum value for the STE. The segmentation module then returns to Operation 421 to select the next frame for the audio. This process is continued until all of the frames in the range of frames has been processed.

Returning to FIG. 4A, the segmentation module continues by now identifying which frames for the audio file contain an utterance or noise. Therefore, the segmentation module selects the first frame of the audio file in Operation 430. Next, the segmentation module computes the STE for the selected frame in Operation 435. The segmentation module then applies a Fast Fourier Transform (FFT) on the frame in Operation 440. Accordingly, the segmentation module computes the SFM in Operation 445 by computing the abstract value of the SFM for the frame. In addition, the segmentation module computes the F for the frame by finding the frequency corresponding to the maximum value of the spectrum magnitude in Operation 450.

Once the three features have been computed for the current frame, the segmentation module evaluates the features to determine whether the frame contains an utterance or noise. Thus, in various embodiments, the segmentation module determines whether any of the calculated features are greater than or equal to the corresponding threshold for the feature in Operation 455. If so, then the segmentation module marks the frame as containing an utterance in Operation 460.

However, if none of the calculated features are greater than or equal to the corresponding threshold for the feature, then the segmentation module marks the frame as containing noise in Operation 465. At this point, in particular embodiments, the segmentation module update the threshold for STE based on the frame identified as containing noise. Therefore, the segmentation module first determines whether the frame is within the range of frames that were used to initially set the STE threshold in Operation 470. The segmentation module performs this operations so that the frames in the set of frames used to set the initial STE threshold are not used again (used twice) to set the STE threshold.

If the frame identified to contain noise is not in the set of frames used to set the initial STE threshold, then the segmentation module updates the STE threshold based on the frame in Operation 475. Accordingly, the segmentation module performs this operation in particular embodiments by keeping track of the number of frames that have been identified as containing noise, updating the minimum STE as ((number of frames containing noise*minimum STE)+ STE of the current frame identified as containing noise)/ number of frames containing noise. The segmentation module then uses the newly determined minimum STE to update the threshold by calculating primary STE threshold*log of newly determined minimum STE.

At this point, the segmentation module determines whether another frame exists for the audio file in Operation 480. If so, then the segmentation module returns to Operation 430, selects the next frame, and repeats the operations described above for the newly-selected frame. However, if all the frames have been processed for the audio file, then the segmentation module identifies the set of utterance segments and the set of noise segments based on how the frames have been label as either containing an utterance or noise in Operation 490.

Turning now to FIG. 4C, the segmentation module sets a count to one in Operation 491 and selects the first frame for the audio in Operation 492. Next, the segmentation module determines whether the currently-selected frame is marked the same (as containing an utterance or noise) as the reference frame in Operation 493. The reference frame is the previously processed frame for the audio file. If the currently-selected frame is marked the same as the reference frame, then the segmentation module advance the count by one in Operation 494. However, for the first pass, a reference frame has not been set since the currently-selected frame is the first frame of the audio file. Therefore, the currently-selected frame is not marked the same as the reference frame.

Accordingly, the segmentation module then determines whether the current count is over a threshold in Operation 496. In various embodiments, a threshold is set that identifies a particular number of consecutive frames for the audio that must be marked the same as containing an utterance or noise to identify an utterance segment or noise segment. For instance, in particular embodiments, the threshold may be set to ten consecutive frames. Therefore, in this instance, at least ten consecutive frames must be identified for the audio marked as containing an utterance for an utterance segment to be identified for the audio. Here, since the segmentation module is making a first pass and the count is currently one, the count is not over the threshold.

However, if the currently-selected frame is marked differently than the reference frame and the count is over the threshold (in a subsequent pass), then the segmentation module records the previous frames up to the currently-selected frame as a segment marked the same as the reference frame in Operation 497. For example, the reference frame may be marked as containing an utterance. The segmentation module selects the next frame for the audio and determines this frame is marked as containing noise. Therefore, the currently-selected frame is marked differently than the reference frame. Next, the segmentation module determines if the current count is over the threshold, the threshold being set at ten. Here, the segmentation module determines the current count is set at twenty-three and is therefore over the threshold. The count indicates that the previous twenty-three frames were marked as containing an utterance. Thus, the segmentation module records the previous twenty-three frames as an utterance segment for the audio.

In addition, the segmentation module in various embodiments is configured to also record some type of marker(s) to identify where in the audio the segment occurs. For instance, the segmentation module may record a start time and end time for the segment, a start time and time duration of the segment, memory location of the segment with respect to the audio, etc.

Once the segmentation module has recorded the segment, the module sets the current frame as the reference frame in Operation 498. In addition, the segmentation module sets the count to one in Operation 499. The segmentation module then checks to see if any more frames remain in Operation 495. If so, then the segmentation module returns to Operation 492, selects the next frame, and repeats the operations already discussed for the newly-selected frame.

Once all of the frames have been processed, the segmentation module records the remaining fames as a segment in Operation 499A. At that point, the process ends and as a result, the audio has been segmented into a set of utterance segments and a set of noise segments.

Extraction Module

Figure 5:
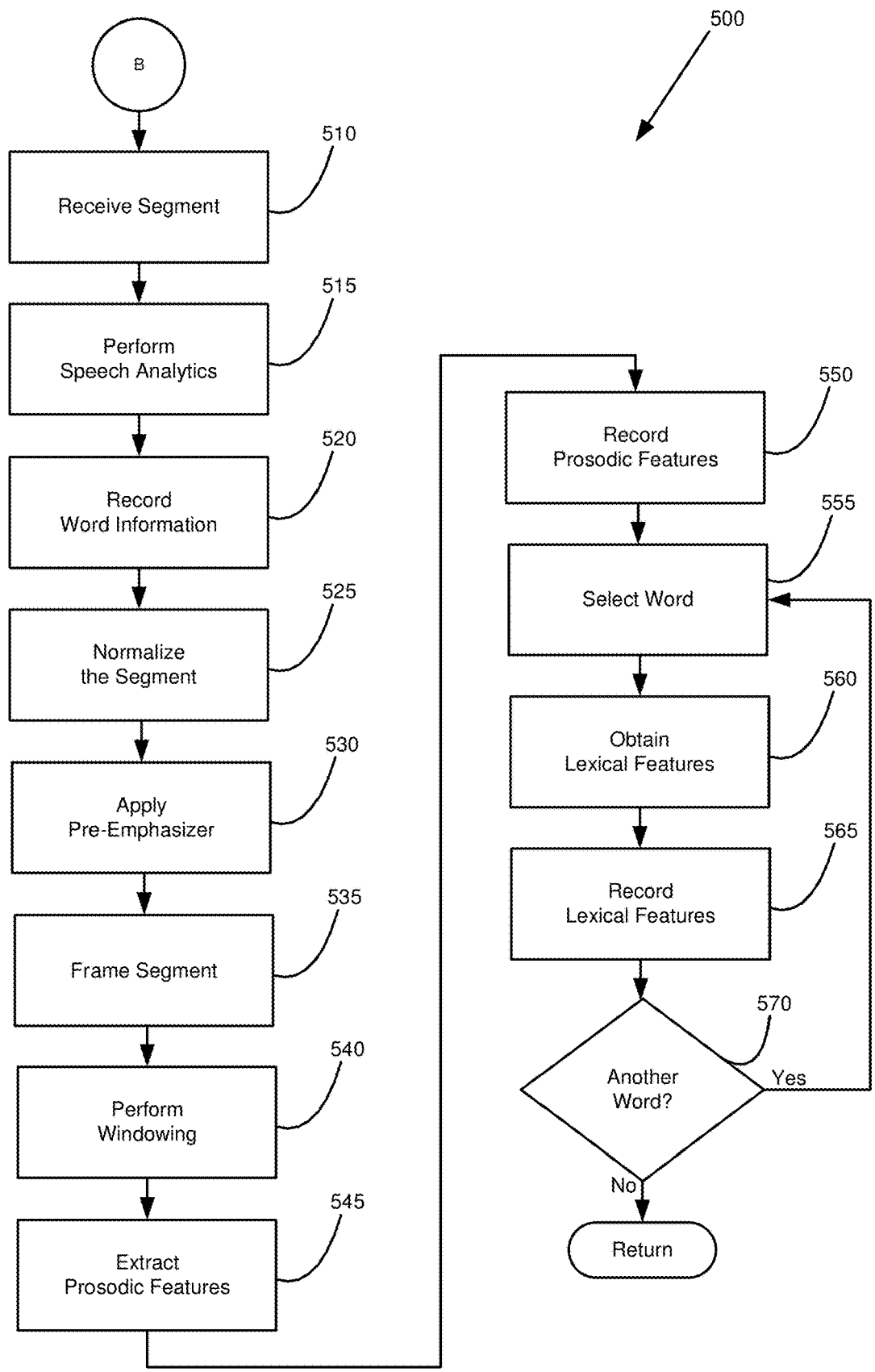
FIG. 5 illustrates a process flow for extracting features for an utterance segment of an audio in accordance with various embodiments of the invention

Turning now to FIG. 5, additional details are provided regarding a process flow for extracting features for an utterance segment of an audio in accordance with various embodiments of the invention. Specifically, FIG. 5 is a process flow carried out by an extraction module for performing such functionality according to various embodiments of the invention. For example, the process flow shown in FIG. 5 may also correspond to operations carried out by a processor in a component, such as an analytics component 240 described above with respect to the contact center architecture 200, as it executes the extraction module stored in the component's volatile and/or nonvolatile memory.

As the reader may recall, the extraction module is invoked by the previously-discussed audio analytics module in various embodiments to extract features from an utterance segment of an audio. However, in other embodiments, the extraction module may be invoked by a different module or may be invoked as a stand-alone module.

Turning now to FIG. 5, the process 500 begins with the extraction module receiving an utterance segment in Operation 510. Here, depending on the embodiment, the extraction module may be provided with the segment by another module, such as the audio analytics module previously discussed, or the extraction module may retrieve the segment from the audio based on some type of markers identifying where in the audio the segment can be found.

Next, the extraction module identifies the words spoken in the utterance segment in Operation 515. Here, in various embodiments, the extraction module may be configured to perform some type of speech analytics on the utterance segment to identify the words spoken in the segment. Furthermore, the extraction module may identify an order of the words along with some type of marker (e.g., timestamp) for each word identifying where in the utterance segment the word appears. The extraction module then records the identified words and related information (such as the locations of the words in the segment) in Operation 520.

At this point, the extraction module performs pre-processing on the utterance segment. Here, pre-processing involves pre-emphasis, framing, and windowing. In particular embodiments, the extraction module may initially normalize the segment to adjust the volume of the audio portion to a standard level in Operation 525. This is performed because recording levels can cause the volume to differ greatly from word to word, as well as possibly some DC offset.

The extraction module then applies a pre-emphasizer to spectrally flatten the speech signal of the segment and remove low frequency noise in Operation 530. Generally, energies belonging in the voiced samples are distributed in the lower frequencies than in the higher frequencies. Therefore, the motive behind pre-emphasis is to compensate the high frequency, which has been suppressed during the sound production mechanism of humans, to boost the amount of energies in the high frequencies. Here, the pre-emphasizer is represented by a first order high pass filter and the input frequency range most susceptible to noise is boosted. That is to say, the process is designed to increase (within a frequency band) the magnitude of some (usually higher) frequencies with respect to the magnitude of other (usually lower) frequencies to improve the overall signal-to-noise ratio. As a result, the speech sound becomes sharper than the original speech signal with a smaller volume after the pre-emphasis.

Next, the extraction module performs framing on the utterance segment in Operation 535. A speech signal is generally unstable. That is to say, the statistical properties of a speech signal across time is not constant. However, a speech signal can be regarded as stationary over a short interval of time. Therefore, a speech signal can be cut into short blocks of time (frames) from which time-varying characteristics can be extracted for each frame. Accordingly, the extraction module extracts the features once every P milliseconds (e.g., once every 40 ms), which is termed as frame rate, while the duration (length) of the frame is Q milliseconds (80 ms). Generally Q is bigger than P, resulting in an overlap between two consecutive frames. Such a frame rate and frame length ensure all sampled values are accounted for in at least two frames.

After framing, the extraction module applies windowing on each frame in Operation 540 to reduce the signal discontinuities at the edges of the frame, which can create problems when performing Fourier analysis. Depending on the embodiment, any one of a number of windowing functions can be applied such as, for example, rectangular window, Hanning window, or Hamming window. However, the most widely used window function is the Hamming window. For instance, in particular embodiments, the coefficients of a Hamming window are computed from the following equation, in which the window length is L=N+1:

$$w(k)=0.54-0.46 \cos(2\Pi k/K-1)$$

Next, the extraction module extracts prosodic features from each frame for parameterization of feature vector in Operation 545. The first of these features is pitch. Pitch is the fundamental frequency of audio signals, which is mainly explained in terms of highness or lowness of a sound. Pitch-related statistics convey considerable information in speech about emotions status in a speech segment. Here, in various embodiments, the extraction module calculates pitch for each frame using some type of pitch detection algorithm. For example, in particular embodiments, the extraction module may make use of a third-party proprietary product such as the pitch function of the Matlab Signal Processing Toolbox.

Here, the pitch function provides estimates of the fundamental frequency over time for an audio input. That is to say, the pitch function provides a vector of estimated fundamental frequencies and a vector of locations associated with the frequency estimates. Accordingly, the pitch function may use any one of a number of different methods of calculating pitch that include normalized correlation function, pitch estimation filter, cepstrum pitch determination, log-harmonic summation, and summation of residual harmonics. Each of these methods of calculating pitch provide trade-offs in terms of noise robustness, accuracy, and computation expense. In addition to $F_0$, the highest normalized cross correlation value found to determine $F_0$ (AC PEAK) is also determined for each frame.

The second set of prosodic features is the Linear Predictive Coding Coefficients (LPCCs). Linear Predictive Coding (LPC) is a tool used in audio signal processing for representing the spectral envelop of a digital signal of speech in compressed form, using the information of a linear predictive model. The LPC algorithm produces a vector of coefficients that represent a smooth spectral envelop of the Discrete Fourier Transform (DFT) magnitude of a temporal input signal. The principle of LPC is that speech consists of an impulse that is passed through an all-pole filter that corresponds to the vocal tract transfer function, and it analyzes the given segment of speech to find the coefficients of the filter that represent the voice tract. Here, the extraction module extracts the LPCCs for the portion of the utterance segment by applying a LPC function to each frame to compute the thirteen LPCCs for the frame.

For example, in particular embodiments, the extraction module may make use of the lpc function of the Matlab Signal Processing Toolbox for computing the LPCCs of each frame. Here, the equation lpc(x,p) is used, where p is the pth order linear predictor (Finite Impulse Response Filter) that is used to predict the current frame: $x(n)=-a(2)x(n-1)-a(3)(n-2) \ldots -a(p+1)x(n-p)$, from which the thirteen LPCCs are computed.

The third set of prosodic features is the Mel Frequency Cepstral Coefficients (MFCCs). The Mel scale is based on the human ear scale. That is to say, the Mel scale is based on the non-linear human perception of the frequency of sound. Thus, MFCCs are considered to be one of the better approximations of the human ear. The first thirteen coefficients represent audio based on perception.

To extract the MFCCs, the audio is converted from the time domain to the frequency domain by using FFT to find the magnitude frequency for each frame. Specifically, the discrete Fourier transform (DFT) of a windowed speech signal is computed. The Mel-filter bank is a triangular band pass filter that is equally spaced around the Mel-scale and a Mel is a unit of perceived pitch or frequency of a tone. The power spectrum from the DFT step is then binned by correlating it with each triangular filter in order to reflect the frequency resolution of the human ear. Binning means multiplying the power spectrum coefficients with the triangular filter gain or coefficients and summing the resultant values to obtain the Mel-spectral coefficients. After that, the log of the Mel-spectral coefficients is taken to level unwanted ripples in the spectrum. Finally, the discrete cosine transform (DCT) is applied to the log Mel-cepstrum to obtain the MFCCs.

Here, in particular embodiments, the extraction module again may make use of a third-party proprietary product such as the Matlab Signal Processing Toolbox for computing the MFCCs for each frame. Specifically, the mfcc function in the Signal Processing Toolbox extracts the MFCCs from an audio signal. The input is an audio signal (the segment) as a vector of frames based on a sample rate and the number of coefficients to return can be specified. The mfcc function uses a filter bank of forty half-overlapped triangles. The output of the function is a L-by-M matrix in which L is the number of frames and M is the number of coefficients returned per frame.

As is discussed further herein, various embodiments of the invention are configured to determine where sentence boundaries exist within the utterance segments. Therefore, with this in mind, the extraction module extracts prosodic features corresponding to inter-word boundaries found in the utterance segment. Specifically, in particular embodiments, the extraction module extracts prosodic features reflecting pause durations, phone durations, and pitch information. The pause features are extracted at inter-word boundaries found in the segment, that is to say, the pause features are extracted at spaces/pauses occurring between two consecutive words found in the segment. Duration, frequency, and voice quality features are extracted mainly from the words (or window) preceding the boundaries. Pitch-related features reflecting the difference in pitch range are also extracted across the boundaries.

Breaks in prosodic continuity provide important cues to boundaries between semantic units, such as a sentence. In various embodiments, the extraction module is configured to use a recognizer to extract a pause duration feature at a boundary. The recognizer is trained as an individual phone that can occur optionally between words during training. In the case of no pause at the boundary, this pause duration feature is output as zero. Thus, in particular embodiments, the duration of the pause preceding a word before a boundary is also extracted, to reflect whether speech right before the boundary was just starting or continuous from previous speech.

Another cue to boundaries in speech is a slowing down toward the end of a unit, referred to as pre-boundary lengthening. Thus, in various embodiments, the extraction module is configured to extract measures that reflect duration characteristics of the last rhyme of the syllable preceding a boundary. Accordingly, each phone in the rhyme is normalized for inherent duration as $$\Sigma \frac{\text{duration of phone} - \text{mean duration of phone}}{\text{standard deviation duration of phone}},$$

where the mean duration of phone and the standard deviation duration of phone are the mean and standard deviation of the current phone over all conversations in the training data. Rhyme features include the average normalized phone duration in the rhyme, computed by dividing the normalized duration measure (from the equation) by the number of phones in the rhyme. In addition, the extraction module may extract the longest normalized phone, as well as the longest normalized vowel, found in the word preceding a boundary to capture lengthening of pre-final syllables in a multisyllabic word. Further, the normalized duration measures are bin in particular embodiments so that they reflect pre-boundary lengthening, rather than segmental information.

As already discussed, the extraction module in various embodiments generates estimates of frame-level $F_0$. However, in particular embodiments, the extraction module also performs post-processing on the output. The post-processing initially involves minimizing noise in the output via filtering. Here, $F_0$ halving and doubling are estimated by a lognormal tied mixture model (LTM) of $F_0$, based on a histogram of $F_0$ values collected from the channel containing the audio for the speaker. Note that, although not shown in FIG. 5, such a histogram may be constructed by the extraction module (or some other module) based all of the utterance segments identified for the audio file of the speaker.

The $F_0$ distribution for the speaker is modeled by three lognormal modes spaced log 2 apart in the log frequency domain. The locations of the modes are modeled with one tied parameter (μ−log 2, μ, μ+log 2), variances are scaled to be the same in the log domain, and mixture weights are estimated by an expectation maximization (EM) algorithm. This approach allows estimation of speaker $F_0$ range parameters that are useful for $F_0$ normalization.

Next, the extraction module applies median filtering to smooth voicing onsets during which the speaker is unstable, resulting in local undershoot or overshoot. Here, in particular embodiments, the median filtering is applied to windows of voiced frames with a neighborhood size of seven plus or minus three frames.

At this point, the extraction module fits the $F_0$ contours by a simple piecewise linear model such as $$\hat{F}_0 = \sum_{k=1}^{K} (a_k F_0 + b_k) I_{[x_{k-1} < F_0 < x_k]},$$

where K is the number of nodes, $x_k$ are the node locations, and $a_k$ and $b_k$ are the linear parameters for a given region. The parameters are estimated by minimizing the mean squared error with a greedy node placement algorithm. The smoothness of the fits is fixed by two global parameters, the maximum mean squared error for deviation from a line in a given region, and the minimum length of a region. The extraction module can now extract features from the filtered and stylized $F_0$ contour such as $F_0$ reset features, $F_0$ range features, $F_0$ slope features, and $F_0$ continuity features.

The reset features are designed to capture the tendency of speakers to reset pitch at the start of a sentence boundary relative to where he or she left off. Typically the reset is preceded by a final fall in pitch associated with the ends of such boundaries. Thus, a larger reset is expected at sentence boundaries than at non-sentence boundaries. In various embodiments, the extraction module takes measurements from the stylized $F_0$ contours for the voiced regions of the word preceding and the word following an inter-word boundary, at either the minimum, maximum, mean, starting, or ending stylized $F_0$ value within the region associated with each of the words. Accordingly, numerous features, such as the log of the ratio between the two values and/or the log of the difference between the two values, are computed to compare the preceding word to the following word to identify a large reset, indicating the presence of a sentence boundary.

The range features reflect the pitch range of a single word (or window), relative to one of the speaker-specific global $F_0$ range parameters computed from the LTM described earlier. Here, in various embodiments, the extraction module extracts these features from the preceding word (window) from an inter-word boundary. Depending on the embodiment, the extraction module may estimate the $F_0$ baseline, topline, and/or some intermediate range measures for the speaker-specific range parameters. For example, the module may estimate the $F_0$ baseline as occurring halfway between the first mode and the second mode in the speaker's $F_0$ histogram.

The slope features involve measuring the degree of $F_0$ excursion before or after the boundary, relative to the particular speaker's average excursion in the pitch range, or simply normalized by the pitch range on the particular word preceding or following an inter-word boundary. While the continuity features involve measuring the change in slope across the inter-word boundary. Here, the continuous trajectories are expected to correlate with non-boundaries, and broken trajectories are expected to correlate with sentence boundaries. Depending on the embodiment, the extraction module may compute scalar (slope difference) and/or categorical (rise-fall) features.

At this point, the extraction module records the extracted prosodic features for the utterance segment in Operation 550. Depending on the embodiment, the extraction module may store the features in volatile or non-volatile memory.

For instance, the features may be stored in volatile memory so that they are available to other modules for use in identifying non-semantic characteristics in an audio. Here, in particular embodiments, since the use of these features is not beyond the modules' use to identify the non-semantic characteristics, the features are not permanently stored. While in other instances, the use of the features may be more long-term and therefore, the features may be stored in a more permanent fashion.

Continuing on, the words spoken in an utterance segment are not only important, but also properties related to the words. This is because although some key words are good indicators of certain events, other lexical information can also be helpful in identifying events such as the co-occurrence of a word with other words, a word's part-of-speech (POS) tag, and a word's semantic class. Therefore, in particular embodiments, the extraction module is also configured to obtain lexical information (features) for the words found in the segment that includes word features, POS features, and class features.

Accordingly, the extraction module selects a word for the utterance segment in Operation 555. In various embodiments, the extraction module is configured to select the words in the order in which they appear in the segment. In addition, the extraction module is configured to select the word by selecting the portion (a widow) of the utterance segment (audio signal) that contains the word in various embodiments. Furthermore, this portion (window) of the utterance segment may include additional words that occur prior to and/or after the selected word in the segment.

Following the selection of the word, the extraction module obtains the lexical features for the word in Operation 560. For instance, in particular embodiments, the extraction module may obtain word features that include different lengths of n-grams (e.g., up to four) for the word $W_i$ and different positional information for the location i where the word $W_i$ is present within the segment. An n-gram is a contiguous sequence of n-items from a given sample of text or speech. Accordingly, the word features may include: $<W_i>$; $<W_i, W_{i+1}>$; $<W_{i-1}, W_i>$; $<W_i, W_{i+1}, W_{i+2}>$; $<W_{i-2}, W_{i-1}, W_i>$; $<W_i, W_{i+1}, W_{i+2}, W_{i+3}>$; and $<W_{i-3}, W_{i-2}, W_{i-1}, W_i>$.

Next, the extraction module may obtain POS features in a similar manner to those used for the word features, replacing the word $W_i$ with a part-of-speech tag $P_i$. Here, in particular embodiments, the extraction module may use a third-party POS tagger to initially tag all of the words in the utterance segment (not shown in FIG. 5) and then construct the POS features accordingly.

Furthermore, the extraction module may obtain class features in a similar manner to those used for the word and POS features, replacing the word $W_i$ and POS tag $P_i$ with a word class label $C_i$. Here, in particular embodiments, the word class labels are automatically induced from bigram word distributions. Such word distributions may be constructed as detailed in the article "Class-Based n-gram Models of Natural Language" authored by Peter F. Brown, Peter V. deSouza, Robert L, Mercer, Vincent J. Della Pietra, and Jenifer C. Lai, *Computational Linguistics*, pp. 467-479, 1992, the contents of which are incorporated by reference for all that they teach.

Once the extraction module has obtained the lexical features for the selected word, the module records the features in Operation 565. Similar to the prosodic features, the extraction module may store the features in volatile and/or non-volatile memory depending on the embodiment. At this point, the extraction module determines whether another word exists for the utterance segment in Operation 570. If so, then the extraction module returns to Operation 555, selects the next word, and repeats the operations for extracting and recording lexical features for the newly-selected word. Once the extraction module has processed all of the words for the utterance segment, the process ends.

Identify Laughter Module

Figure 6:
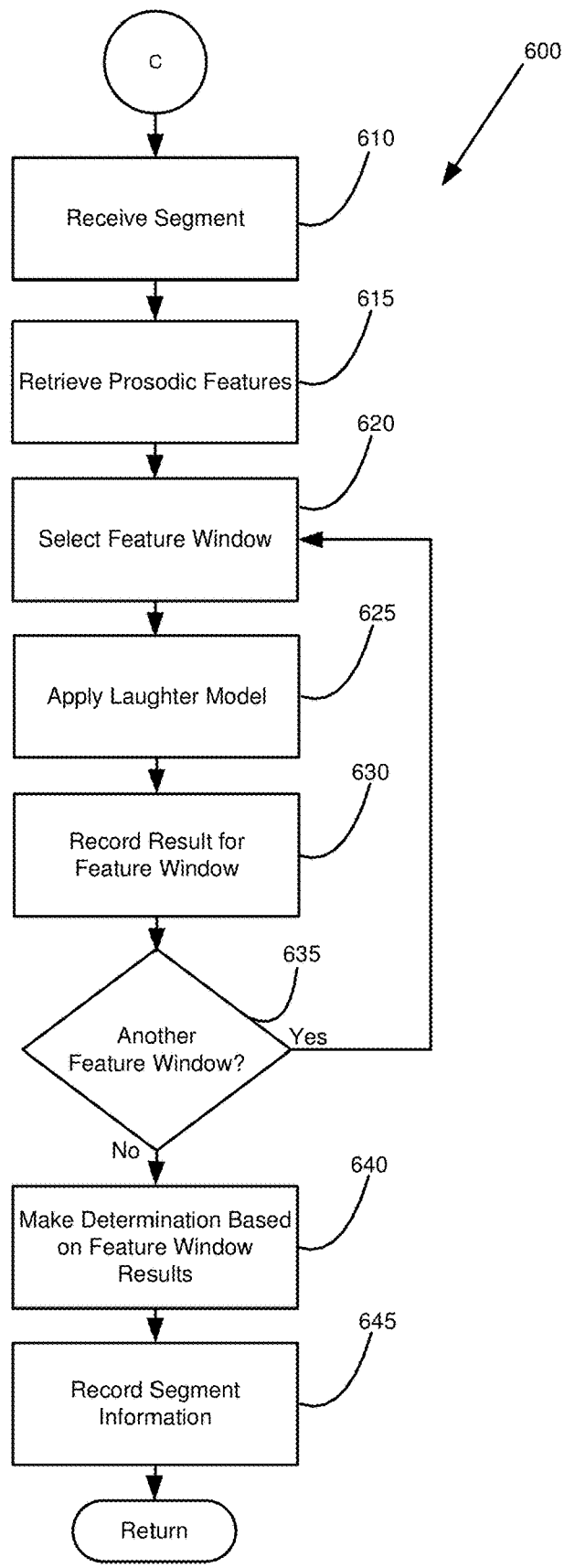
FIG. 6 illustrates a process flow for identifying laugher in an audio segment in accordance with various embodiments of the invention.

Turning now to FIG. 6, additional details are provided regarding a process flow for identifying whether laughter is contain in an utterance segment in accordance with various embodiments of the invention. Specifically, FIG. 6 is a process flow carried out by an identify laughter module for performing such functionality according to various embodiments of the invention. For example, the process flow shown in FIG. 6 may also correspond to operations carried out by a processor in a component, such as an analytics component 240 described above with respect to the contact center architecture 200, as it executes the identify laughter module stored in the component's volatile and/or nonvolatile memory.

As the reader may recall, like the segmentation and extraction modules, the identify laughter module is invoked by the previously-discussed audio analytics module in various embodiments to identify whether or not laughter is contained within an utterance segment. However, in other embodiments, the identify laughter module may be invoked by a different module or may be invoked as a stand-alone module.

In various embodiments, the laughter module makes use of one or more predictive models to determine whether laughter is found in a particular utterance segment. Therefore, in particular embodiments, the module makes use of one or more neural networks as the predictive model(s). A neural network includes an input layer, a hidden layer, and an output layer, in which the input is a window of feature frames where the center frame is the target frame (the frame to be classified). The input layer has a number of neurons (nodes) equal to the input parameters. The hidden layer can have any number of nodes. The output layer has nodes equal to the number of possible classifications (in this case, two—laughter or not). The nodes making up the layers of the neural network work in a feedforward fashion and are fully connected to the nodes of the next layer in one direction. Accordingly, the input nodes of the input layer send data via synapses (weights) to the nodes of the hidden layer, the nodes of the hidden layer send data via synapse to the nodes of the output layer. Therefore, an important aspect of a neural network that influences how well the network is able to perform is the architecture of the network.

The architecture of a neural network specifies what variables are involved in the network and their topological relationships. For instance, some of the variables involved in the network include the weights of the connections between the neurons (nodes) of the network, along with activities of the neurons. The architecture is typically defined by three types of parameters: the interconnection pattern between the different layers of neurons; the learning process for updating the weights of the interconnections; and the activation function that converts a neuron's weighted input to its output activation. The activation function defines the output of a neuron given an input or set of inputs. That is to say, the activation function defines the "firing rate" of the neuron. The behavior of a linear perceptron in a neural network is a network of activation functions that can be either "on" or "off." However, it is the nonlinear activation functions that allow such a network to compute nontrivial problems using only a small number of neurons (nodes).

Accordingly, the activation functions of the network may be any one of several different types depending on the embodiment. For instance, the input layer and/or hidden layer of the neural network may be designed using the sigmoid activation function, which is a mathematical function having an "S" shaped curve (sigmoid curve) and is used to give logistic neurons real-valued output that is a smooth and bounded function of their total input. This function also has the added benefit of having nice derivatives that make learning the weights of a neural network easier. Accordingly, the sigmoid activation function "squashes" real numbers to a range between zero and one. In particular, large negative numbers become zero and large positive numbers become one. On the other hand, the input layer and/or the hidden layer may be designed using the hyperbolic tangent (tanh) activation function, which also "squashes" real numbers, but instead of squashing them to a range between zero and one, the function squashes real numbers to a range of negative one to one and thus is centered around zero.

Other activation functions that may be considered for the input and hidden layer are the rectified linear unit (ReLU) activation function or the leaky ReLU activation function. The ReLU activation function is simply threshold at zero and therefore can be implemented by simply thresholding a matrix of activations at zero in comparison to sigmoid/tanh neurons that involve expensive operations (exponentials, etc.). However, the ReLU activation function can be prone to "die" during training. For example, a large gradient flowing through a ReLU neuron can cause the weights to update in such a way that the neuron will never activate on any data point again, causing the gradient flowing through the neuron to be zero from that point on. The leaky ReLU activation function attempts to fix this problem by having a small negative slope when the input (x) is less than zero instead of being zero.

Finally, the softmax activation function can be implemented at the input and/or hidden layer, and is often implemented at the output layer of a neural network used for classification. This is because by assigning a softmax activation function on the output layer for categorical target variables, the outputs can be interpreted as posterior probabilities, which can be very useful in classification as it gives a certainty measure on classifications. For instance, using the softmax activation function for a neural network used for predicting where a particular segment contains laughter provides a value of a probability of the segment containing laughter and a value of a probability of the segment not containing laughter in which the two probabilities add to one. Thus, the probability values indicate the certainty of the neural network predicting whether or not a particular segment of an audio contains laughter.

As noted, the neural network is primarily made up of an input layer, a hidden layer, and an output layer. As mentioned already, the size of the input layer is typically defined by including a neuron for each input parameter. Similarly, the size of the output layer is typically defined by including a neuron for each possible output classification. However, an important decision with respect to the architecture of the neural network is the size of the hidden layer.

Generally speaking, as the size of the hidden layer increases in a neural network, the capacity of the network increases. That is to say, as the size of the hidden layer increases, the neural network is able to express more complicated functions. However, increasing the capacity of the neural network can be both beneficial and detrimental to the performance of the network. The reason for this is because the complexity of the neural network architecture can lead to overfitting the training data. Overfitting arises when the capacity of the network significantly exceeds the needed free parameters. That is to say, overfitting arises when the network fits the noise in the training data instead of the underlying relationships and as a result, fails to generalize well in unseen examples. However, with that said, the problem of overfitting the training data is normally addressed using practices such as regularization, dropout, and input noise. Therefore, establishing the size of the hidden layer is not typically driven by a concern for overfitting the training data. Instead, the deciding factor in determining the size of the hidden layer is time and computational capabilities available in developing and testing the neural network.

Returning to the neural network used in identifying whether laughter is contained in an utterance segment, the feature window size in various embodiments is set to a window of seventy-five consecutive frames (e.g., resulting in 750 ms), with an offset of thirty-seven frames. This allows the classification of laughter to be based on the middle frame. Therefore, the inputs to the neural network are the features from the frame to be classified and the features from the thirty-seven frames before and after this frame. However, other feature window sizes may be more appropriate in other embodiments, since the results of the neural network are dependent on the size of the input window. Generally, an optimal size may be determined by training several networks using several different size windows and comparing the results.

As for training the network, the data used to train the neural network in various embodiments is split into two groups, a training set and a cross validation set. The data is hand transcribed to be either laughter or non-laughter. Accordingly, the neural network weights are updated based on the training data, using back-propagation, and the cross validation set of data is scored after every training epoch resulting in the cross validation frame accuracy. Training is typically concluded once the accuracy increases by less than 0.5% for a second time.

Accordingly, the identify laughter module makes use of prosodic features as inputs to the neural network. The first of these features that is used is MFCCs. As previously discussed, the Mel scale is based on the human ear scale. That is to say, the Mel scale is based on the non-linear human perception of the frequency of sound. Thus, MFCCs are considered to be one of the better approximations of the human ear. The first thirteen coefficients represent audio based on perception and thus are used by the identify laughter module in various embodiments. In addition, the other feature that is used is the highest normalized cross correlation value found to determine fundamental frequency (AC PEAK) for each frame.

With respect to the architecture of the neural network, the number of nodes for the hidden layer is based on using the MFCCs as the input features and modifying the number of nodes while keeping all the other parameters the same in various embodiments. A neural network is then trained separately for each feature. That is to say, a first neural network is trained for the MFCCs and a second neural network is trained for the AC PEAK. The two networks are then combined by using the probabilities produced by each network as inputs to another neural network. The result of this neural network is then used as the predictor as to whether an utterance segment contains laughter.

Therefore, turning now to FIG. 6, the process 600 begins with the identify laughter module receiving an utterance segment in Operation 610. Here, depending on the embodiment, the identify laughter module may be provided the segment by another module, such as the audio analytics module previously discussed, or the identify laughter module may retrieve the segment from the audio based on some type of markers identifying where in the audio the segment can be found.

Next, the identify laughter module retrieves the prosodic features for the segment in Operation 615. Here, the identify laughter module may be provided information along with the utterance segment that enables the module to identify and retrieve the corresponding features for the frames that make up the utterance segment. Once the features have been retrieved, the identify laughter module selects a feature window in Operation 620. As previously mentioned, depending on the embodiment, the feature window size may be set to a different number of consecutive frames. For instance, in particular embodiments, the window may be set as a window of seventy-five consecutive frames (e.g., resulting in 750 ms), with an offset of thirty-seven frames. This allows the classification of laughter to be based on the middle frame.

At this point, the identify laughter module applies the laughter model by using the extracted features for each frame in the current feature window as input to the neural networks in Operation 625. Accordingly, the laugher model provides a probability of laughter being contained in the middle frame of the feature window. Therefore, the identify laughter module records the result for the current feature window in Operation 630. Here again, depending on the embodiment, the identify laughter module may record the result in volatile and/or non-volatile memory.

The identify laughter module then determines whether another feature window exists for the utterance segment in Operation 635. That is to say, in particular embodiments, the identify laughter module is configured to select the feature window starting with the frames at the beginning of the utterance segment and shift the feature window towards the end of the segment until a prediction has been made with respect to each (or a set number) of middle frames for each of the feature windows. Therefore, if the identify laughter module determines another feature exists for the utterance segment, then the module returns to Operation 620, selects the next feature window for the utterance segment, and repeats the operations to predict whether laughter is found in the middle frame for the newly-selected feature window.

Once the identify laughter module has processed all of the feature windows, the module make a determination as to whether the utterance segment contains laughter based on the feature window results in Operation 640. Here, depending on the embodiment, the identify laughter module may be configured to apply one or more rules in making such a determination. For instance, in particular embodiments, a threshold number of consecutive frames (e.g., 3000) for the utterance segment must be identified as containing laughter for the identify laughter module to determine the segment does indeed contain laughter. While in other embodiments, a threshold number of overall frames, whether consecutive or not, for the utterance segment must be identified as containing laughter for the identify laughter module to determine the segment does indeed contain laughter. Those of ordinary skill in the art can envision other rules that may be utilized in determining whether the utterance segment contains laughter in light of this disclosure.

Finally, the identify laughter module records its finding in Operation 645. That is to say, the identify laughter module records an indication as to whether the utterance segment was found to contain laughter or not.

Identify Emotions Module

Figure 7:
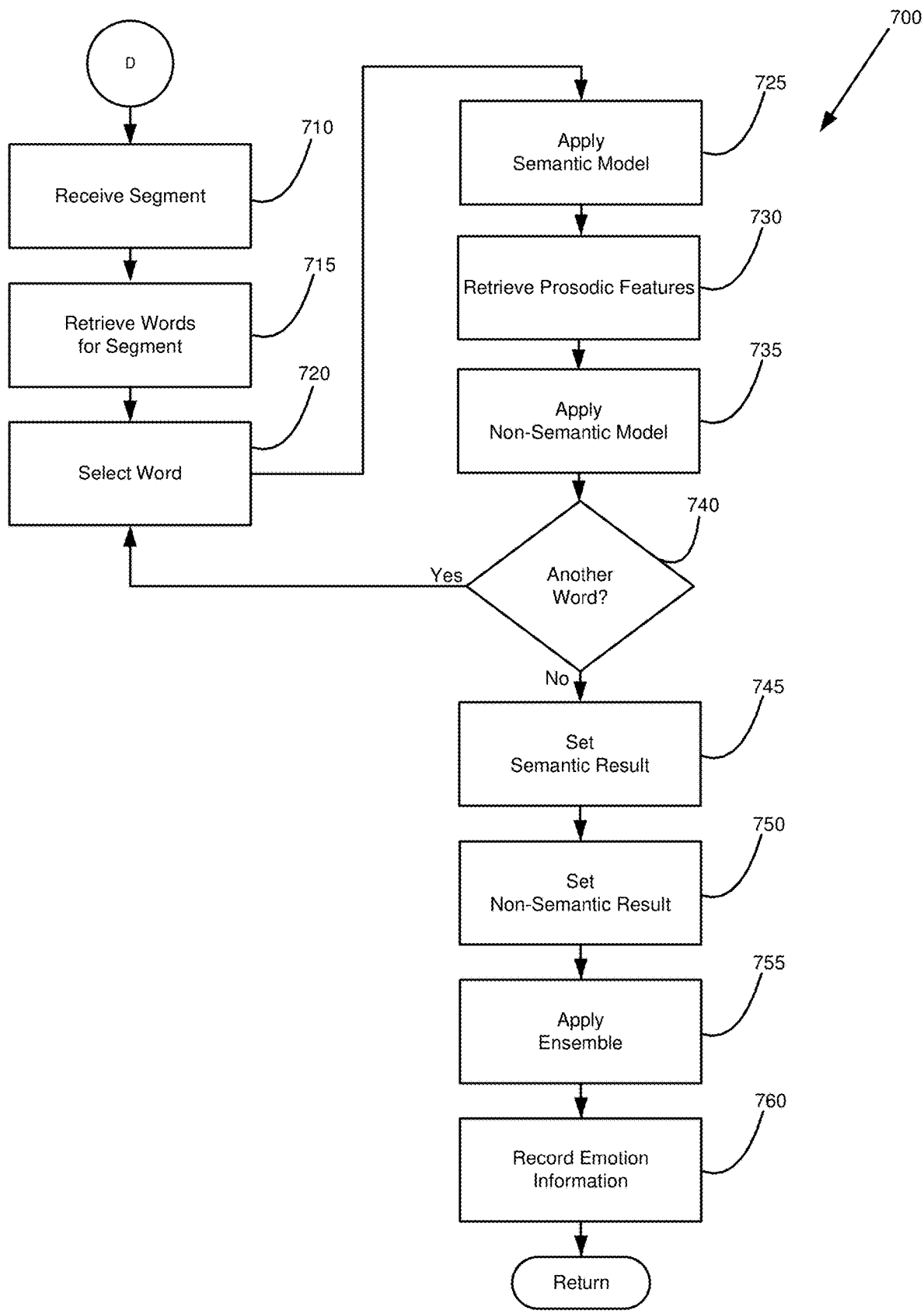
FIG. 7 illustrates a process flow for identifying emotion in an audio segment in accordance with various embodiments of the invention.

Turning now to FIG. 7, additional details are provided regarding a process flow for identifying emotions contained within an utterance segment in accordance with various embodiments of the invention. Specifically, FIG. 7 is a process flow carried out by an identify emotions module for performing such functionality according to various embodiments of the invention. For example, the process flow shown in FIG. 7 may also correspond to operations carried out by a processor in a component, such as an analytics component 240 described above with respect to the contact center architecture 200, as it executes the identify emotions module stored in the component's volatile and/or nonvolatile memory.

As the reader may recall, like other modules discussed herein, the identify emotion module is invoked by the previously-discussed audio analytics module in various embodiments to identify emotions contained within an utterance segment. However, in other embodiments, the identify emotions module may be invoked by a different module or may be invoked as a stand-alone module.

An obstacle that is encountered often with respect to recognizing emotion from speech is the variability of expression even for the same emotion. For instance, both joy and anger have common non-semantic attributes such as amplitude of voice and pitch, while fear and sadness also have some common attributes. Therefore, problems can arise in recognizing these two sets of emotions from one another when extracting emotion directly from a speech signal. Further, some persons may shout when angry, while others do not. Similarly, some persons may speak loudly when happy or excited, while others do not. That is to say, persons will often use both speech semantics and speech non-semantics to express emotions in everyday life.

In light of this, various embodiments of the invention involve recognizing emotions in speech based on both semantic and non-semantic features. Accordingly, the words found in an utterance segment are evaluated along with prosodic features extracted from the segment to recognize emotions found in the utterance. Therefore, turning now to FIG. 7, the process 700 begins with the identify emotion module receiving an utterance segment in Operation 710. Similar to the identify laughter module, depending on the embodiment, the identify emotions module may be provided the segment by another module, such as the audio analytics module previously discussed, or the identify emotions module may retrieve the segment from the audio based on some type of markers identifying where in the audio the segment can be found.

Next, the identify emotions module retrieves the words spoken in the utterance in Operation 715. Here, in various embodiments, the identify emotions module may be provide information along with the segment that allows for the module to retrieve the words spoken in the utterance segment from storage (whether volatile or non-volatile).

Once the words have been retrieved for the utterance segment, the identify emotions module selects a word for the utterance in Operation 720. In various embodiments, the identify emotions module is configured to select the words in the order in which they appear in the utterance. In addition, the identify emotions module in various embodiments is configured to select the word by selecting the portion of the utterance segment that contains the word.

Next, the identify emotions module applies an emotion lexicon to the word in Operations 725. Often different emotions are expressed through different words. Here, the emotion lexicon provides a list of emotions and words that are indicative of each emotion. Such lexicons have been developed by third parties such as, for example, the National Research Council Canada (NRC) Word-Emotion Association Lexicon. This lexicon is a list of English words and their associations with eight basic emotions: anger; fear; anticipation; trust; surprise; sadness; joy; and disgust, and two sentiments: negative and positive. The lexicon was developed by Saif M. Mohammad and Peter D. Turney by using crowdsourcing to provide manual annotations, specifically, Amazon Mechanical Turk®. See "Emotions Evoked by Common Words and Phrases: Using Mechanical Turk to Create an Emotion Lexicon," Saif M. Mohammad and Peter D. Turney, *Proceedings of the NAACL HLT* 2010 *Workshop on Computational Approaches to Analysis and Generation of Emotion in Text*, pages 26-34, Los Angeles, Calif., June 2010. This lexicon can be licensed. Here, the identify emotions module looks up the word, and synonyms for the word, in the emotion lexicon to identify any emotions associated with the word.

It is noted that the identify emotions module may be configured to identify a certain set of emotions depending on the embodiment. For instance, although NRC's emotion lexicon is annotated with the emotions anger, fear, anticipation, trust, surprise, sadness, joy, and disgust, the identify emotions module may only be configured to identify the emotions anger, fear, surprise, sadness, and joy. Such may be the case because the capabilities of the identify emotions module to identify certain emotions in audio may be linked to the particular semantic and/or non-semantic features extracted and used to identify such emotions. Further, in particular embodiments, a class is used to indicate when no emotion is identified for a particular utterance segment. For instance, the class "neutral" may be assigned to an utterance segment in which no emotion has been identified as expressed in the segment.

At this point, the identify emotions module retrieves prosodic features for the frames that make up the portion of the segment containing the word in Operation 730. In various embodiments, the prosodic features includes pitch, MFCCs, and LPCCs. Again, similar to the words, the identify emotions module may be provided with information along with the segment that allows for the module to locate and retrieve the stored features for the frames from memory.

At this point, the identify emotions module applies a non-semantic model to the prosodic features in Operation 735. In various embodiments, this model is some type of predictive model made up of classifiers to predict emotional labels using the prosodic features. For instance, in particular embodiments, the non-semantic model is made up of one or more support vector machines (SVMs).

SVMs are generally a set of related supervised learning methods that can be used for classification purposes. That is to say, SVMs are generally used to classify an instance into one class or another. Given a set of training examples, each marked as belonging to one of two categories (e.g., classes), a SVM training algorithm builds a model that predicts whether a new sample falls into one of the two categories. This model is a representation of the examples as points in space (a hyper plane), mapped so that the examples of the separate categories are divided by a clear gap that is as wide as possible. Accordingly, new examples can be mapped into the same space and predicted to belong to either category based on which side of the gap they fall on.

With that said, it is often the case that the data for a particular classification problem is not linear and therefore, a separating hyper plane cannot be found to separate the training examples. Accordingly, in these instances, a kernel function may be used to non-linearly map the data to a high-dimensional space that is linearly separable. In essence, this kernel function represents a dot product of the data after performing a non-linear mapping on the data. That is to say, a suitable function that corresponds to a dot product of some non-linear mapping on the data (a kernel function) is used instead of the dot product itself. In many instances, the appropriate kernel function to use for a particular classification problem is selected via trial and error.

In this instance, the classification problem involves more than two classes (more than two emotions). In general, a single SVM model provides a prediction (a selection) for a particular instance of being in a first class or a second class. However, a plurality of SVM models may be used together to address instances involving more than two classes. For instance, a one-against-all approach or a one-against-one approach may be used. For these two approaches, multiple binary SVM models are trained separately and their predictions are then combined.

In the case of a one-against-all approach, a SVM model is constructed for each class and the SVM model for a particular class predicts whether an instance is a member of the particular class or is a member of the remaining classes. For example, the outcomes for a particular event of interest may be A, B, and C. Thus, in this example, a first SVM model is constructed to predict whether a particular instance of the event is outcome A or is outcome B or C Likewise, a second SVM model is constructed to predict whether the particular instance of the event is outcome B or is outcome A or C, and so forth. For this particular approach, the particular instance is assigned to the outcome with the SVM model that provides the highest score among all the SVM models (the largest value in the decision function).

In the case of a one-against-one approach, a SVM model is constructed for each pair of classes. For instance, in the example from above, SVM models would be constructed for "A v. B," "A v. C," and "B v. C." For this approach, each SVM model is given a vote with respect to classifying a particular instance of the event, and the class that receives the highest number of votes is selected as the class (outcome) for the particular instance of the event.

In various embodiments, the identify emotions module performs a classification for every single frame of the portion of the utterance segment and then labels the portion of the segment with the emotion having the maximum number of frames labeled. Note that in particular embodiments, an emotion must be identified (classified) with a certain level of certainty for a frame of the portion to be labeled with the emotion. Likewise, in particular embodiments, an emotion must be identified (classified) for a certain number of frames of the portion for the portion to be identified as containing the emotion.

Once the identify emotions module has applied the non-semantic model to the portion of the utterance segment, the identify emotions module determines whether another word exists for the segment in Operation 740. If so, then the identify emotions module returns to Operation 720, selects the portion of the utterance segment containing the word, and repeats the operations discussed above for the newly selected portion. Once all of the words (portions of the utterance segment) have been processed, the identify emotions module then sets one or more emotions for the utterance segment.

To accomplish this task, the identify emotions module in various embodiments set a result for the words found in the segment in Operation 745. Here, the identify emotions module identifies one or more emotions for the segment based on the results of the semantic model. Looking at an example segment that contains the phase "I cannot disagree that I'm fortunate to be able to take this journey," the following words may have been identified in the emotion lexicon as being associated with the following emotions: disagree—anger; fortunate—surprise and joy; and journey—fear and joy.

In various embodiments, the identify emotions module may be configured to use some set of rules in deciding the overall emotion(s) to assign to the utterance segment. For instance, the rule may require an emotion be identified for a certain threshold of the words in the segment (a certain number of words in the segment or a certain percentage of words in the segment). For example, the threshold may be set at fifteen percent of the words in the segment. Therefore, at least fifteen percent of the words found in the utterance segment must be associated with a particular emotion to identify the emotion as being expressed in the segment.

In the example, the phrase has a total of thirteen words. Of these words, one word (disagree) is associated with the emotion anger, and two words (fortunate and journey) are associated with the emotion joy. Therefore, 7.7% of the words are associated with the emotion anger and 15.4% of the words are associated with the emotion joy. Thus, in this example, the identify emotions module would set the result for the utterance segment with respect to the semantics found in the segment to the emotion joy.

Had two emotions been over the threshold, for example, had both the emotions anger and joy been associated with over fifteen percent of the words in the segment, then the identify emotions module may be configured to assign both emotions to the segment, or assign the emotion with the higher percentage of words associated with the emotion. Those of ordinary skill in the art can envision other configurations the identify emotions module may use to assign one or more emotions to the utterance segment in light of this disclosure.

Next, the identify emotions module sets a result for the utterance segment based on the segment's non-semantic properties in Operation 750. Similar to the previous operation, the identify emotions module identifies one or more emotions for the segment based on the results of the non-semantic model. Again, looking at the example ("I cannot disagree that I'm fortunate to be able to take this journey"), the following portions of the segment (words) may have been identified via the prosodic features extracted from the portions as being associated with the following emotions: disagree—surprise; fortunate—surprise and joy; able—joy; take—joy; and journey—joy.

Again, depending on the embodiment, the identify emotions module may be configured to use some set of rules in deciding the overall emotion(s) to assign to the utterance segment based on the prosodic properties. For instance, the rules may require an emotion be identified for a certain percentage of the words in the segment and that percentage may be set at twenty-five percent. Therefore, in the example, the identify emotions module determines the emotion surprise is found in 15.4% of the words and the emotion joy is found in 30.8% of the words. Therefore, the identify emotions module sets the non-semantic result to the emotion joy.

Different rules and/or different thresholds may be used by the identify emotions module depending the embodiment and/or the circumstances. For instance, in one particular embodiment, the identify emotions module may be configured to use a different threshold depending on the number of words found in the utterance segment. While in another embodiment, the identify emotions module may be configured to use a different rule and/or threshold depending on the emotion being considered. Those of ordinary skill in the art can envision other rules and/or thresholds that may be implemented in light of this disclosure.

At this point, the identify emotions module in various embodiments applies an ensemble to the semantic result and the non-semantic result in Operation 755. That is to say, in various embodiments, the result of the semantic model (applying the emotion lexicon to the words of the segment) and the result of the non-semantic model (applying the non-semantic features to the SVMs) are combined using an ensemble to improve the overall accuracy in predicting whether one or more emotions are contained within the utterance segment.

Depending on the embodiment, the ensemble may be based on any one of several different techniques. The first of these techniques is bagging. Bagging involves combining the results via majority voting so that the class (emotion) that receives the most votes is selected as the class (emotion) for the particular instance. Here, bagging would involve combining the semantic result and the non-semantic result by giving each result a vote in determining whether a particular utterance segment contains an emotion.

However, a problem with using bagging in this instance is when each result provides a different prediction. For example, the question becomes what should be the selected prediction for a particular utterance segment in an instance when the semantic model predicts the utterance segment contains the emotion anger and the non-semantic model predicts the utterance segment contains the emotion sadness? Such an instance may be handled differently depending on the embodiment. For example, in one embodiment, the prediction for the non-semantic model may be used because this model is considered to be more reliable because a speaker has a harder time manipulating non-semantic features with respect to expressing an emotion. While in another embodiment, each of the results may be weighted based on the accuracy of each model. Here, the accuracy for each model can be based on, for example, historical performance in correctly identifying emotions expressed by parties in segments of audio recordings.

A second technique is boosting. This technique involves training the combination of models using the semantic and non-semantic features using a weighted training dataset in which each utterance segment in the training dataset has a weight. Here, when a segment is misclassified by one of the models, the utterance's weight is increased so that the next model is more likely to classify it correctly. The output is the weighted majority of the two models. Boosting, in general, decreases the bias error and builds strong predictive models. However, boosting can sometimes overfit the training dataset.

Finally, a third technique is stacking. The basic idea behind stacking is using a pool of base classifiers (e.g., the semantic model and the non-semantic model) and then using another classifier to combine their predictions, with the aim of reducing the generalization error. Stacking can lead to a decrease in either the bias or variance error depending on the combining learner used. For instance, in particular embodiments, the semantic and non-semantic models may be combined into a neural network built (trained, validated, and tested) using utterance segments annotated with emotions. While in other embodiments, the models may be combined using some other type of modeling such as a SVM or a decision tree. Those of ordinary skill in the art understand that other types of models may be utilized to generate the ensemble.

For instance, in various embodiments, the ensemble can be generated as a multinomial logistic regression model. A multinomial logistic regression model is a supervised classification model that uses the techniques of a linear regression model in an initial stage to calculate scores and then applies the softmax function to predict a target class (e.g., a target emotion for an utterance segment). The liner regression model is WX+b, where X is the set of inputs, e.g., a matrix that contains all the numerical values for X=[x1, x2, x3, . . . ] and W is a matrix that contains all the input weights W=[w1, w2, w3, . . . ]. Accordingly, the linear model output is w1*x1, w2*x2, w3*x3, . . . that make up the scores.

The question becomes what values to assign the weights w1, w2, and w3, . . . . Here, the weights are estimated in various embodiments from a training dataset derived from predictions made by the semantic and non-semantic models and the actual outcomes (whether parties actually express emotions) for a set of utterance segments and the best weights result in a model that predicts a value close to one for the target class (e.g., the emotion expressed in the segment) and values close to zero for the other classes (e.g., the emotions not expressed in the segment).

The general workflow for training a multinomial logistic classifier involves: Inputs (X)→Apply Linear Regression Model→Scores (Y)→Apply Softmax→S(Y)→Apply Cross Entropy→One Hot Encoding. In this instance, the inputs are the predictions from each of the two models. That is to say, the inputs are the prediction of the semantic model and the prediction of the non-semantic model for the utterance segment found in the training dataset. The key here is the inputs to a multinomial logistic regression must always be numerical. If the features are not numerical, then the features must be converted into numerical values. For example, in particular embodiments, an integer value is assigned to each of the emotion features: anger can be assigned the integer one; fear can be assigned the integer two; surprise can be assigned the integer three; and so on. Accordingly, these numerical values assigned to the different emotions are used as inputs to the linear regression model to produce scores.

Next, the softmax equation is applied to the scores. The softmax equation is a probabilistic function that calculates the probabilities for the given scores. Thus, using the softmax function returns a high probability value for the high score and lower probabilities for the remaining scores. Accordingly, the calculated probabilities are in the range of zero and one. In addition, the sum of these probabilities is equal to one.

The cross entropy is the last stage of training and the cross entropy function is used to find the similarity between the probabilities calculated from the softmax function and a target one hot encoding matrix for the particular utterance segment from the training dataset. A one hot encoding is a mechanism for representing the target value or categorical attribute (emotion expressed) for each utterance segment in the training set into a binary representation. To create the one hot encoding matrix for a segment found in the training set, the matrix includes a value of one or zero for each emotion, with the emotion expressed in the segment having a value of one in the matrix and the emotions not expressed in the segment having a value of zero.

The cross entropy is a distance calculation function that calculates the distance between the calculated probabilities from the softmax function and the one hot encoding matrix for an utterance segment. For the correct class (for the emotion expressed in the segment), the distance value is smaller than the distances for the incorrect classes (for the emotions not expressed in the segment).

Therefore, each observation (utterance segment) in the training set is passed through all of the steps of the workflow during training to compute the proper weights (w1, w2, w3, . . . ). If an utterance segment contains more than one emotion, then the segment may be added multiple times to the training set, one time for each identified emotion. Accordingly, the weights are calculated and updated as the training set is processed. This iteration process, known as parameters optimization, involves calculating weights for each observation and using the calculated weights as input parameters for a loss function along with all the training observations. The iteration process continues until the loss function value is significantly negligible (e.g., is minimized to a threshold). Thus, the expected result of training the multinomial logistic regression classifier is the calculate weights that can then be used to predict emotions for "unknown" utterance segments.

Therefore, returning to FIG. 7, the identify emotions module applies the ensemble in Operation 755 to the result for the semantic model and the result for the non-semantic model to arrive at a conclusion as to what emotion is expressed in the utterance segment. Again, in particular embodiments, multiple emotions may be identified for a particular utterance segment.

For instance, the result for the semantic model may be that the emotions expressed in the utterance are surprise and joy. In addition, the result for the non-semantic model may be the emotion joy. Here, in particular embodiments, the identify emotions module may be configured to apply the ensemble to the different combinations of results from the two models. Specifically, here in the example, the identify emotions module may apply the ensemble initially to the result for the semantic model of surprise and to the result for the non-semantic model of joy. In this instance, the result of the ensemble may be that surprise is expressed in the segment. Next, the identify emotions module may apply the ensemble to the result for the semantic model of joy and to the result for the non-semantic model of joy. This time, the result of the ensemble may be that joy is expressed in the segment. Therefore, in this example, the identify emotions module may conclude that both the emotions surprise and joy are expressed in the particular utterance segment.

Finally, the identify emotions module records the emotion information (e.g., results of the ensemble) for the utterance segment in Operation 760. As is discussed further herein, the emotion information may then be displayed as associated with the utterance segment to an individual who is reviewing the audio file. Accordingly, such information may be helpful to the individual in understanding what was actually conveyed by the party speaking in the segment. For instance, returning to the example, such information may be helpful to the individual in understanding that the party speaking the phrase "I cannot disagree that I'm fortunate to be able to take this journey" in the segment was expressing surprise and/or joy.

Identify Sentence Boundaries Module

Figure 8:
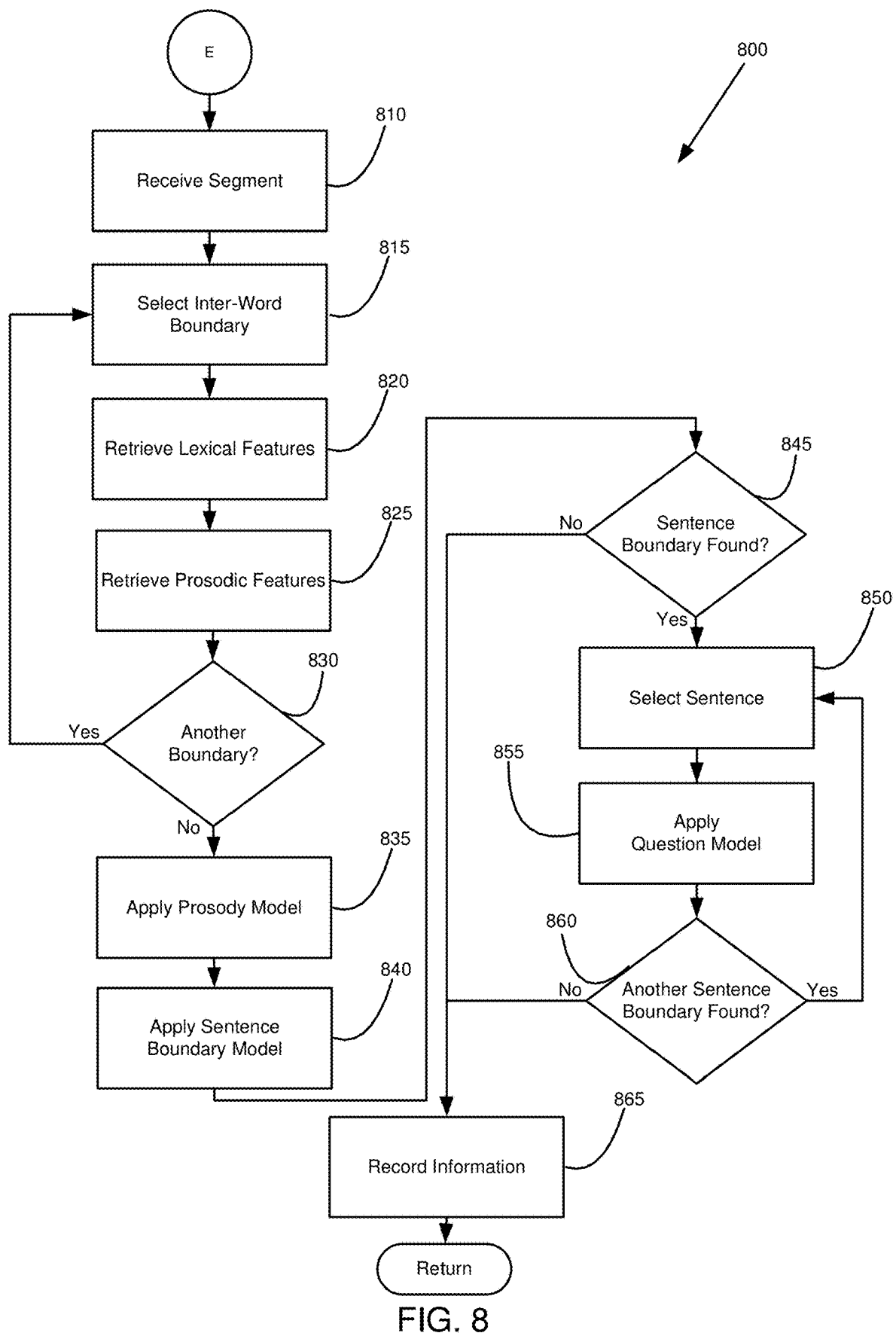
FIG. 8 illustrates a process flow for identifying sentence boundaries in an audio segment in accordance with various embodiments of the invention.

Turning now to FIG. 8, additional details are provided regarding a process flow for identifying sentence boundaries contained within an utterance segment in accordance with various embodiments of the invention. Specifically, FIG. 8 is a process flow carried out by an identify sentence boundaries module for performing such functionality according to various embodiments of the invention. For example, the process flow shown in FIG. 8 may correspond to operations carried out by a processor in a component, such as an analytics component 240 described above with respect to the contact center architecture 200, as it executes the identify sentence boundaries module stored in the component's volatile and/or nonvolatile memory.

As the reader may recall, like other modules discussed herein, the identify sentence boundaries module is invoked by the previously-discussed audio analytics module in various embodiments to identify sentence boundaries contained within an utterance segment. However, in other embodiments, the identify sentence boundaries module may be invoked by a different module or may be invoked as a stand-alone module.

Today, many current speech recognition systems simply output a stream of words without any information on punctuation, although such information can assist the human readability of speech transcripts. Accordingly, various embodiments of the invention involve automatically identifying the location of sentence boundaries in utterance segments.

Here, the identify sentence boundaries module may be configured to identify sentence-like units that correspond to a grammatical sentence, and not necessarily a proper sentence. This is because the notion of a sentence in conversational speech is different from that in written text. A grammatical sentence may be semantically complete but smaller than a proper sentence. For example, a noun phrase in response to a question.

Therefore, turning now to FIG. 8, the process 800 begins with the identify sentence boundaries module receiving an utterance segment in Operation 810. Similar to the previously-discussed modules, depending on the embodiment, the identify sentence boundaries module may be provided the segment by another module, such as the audio analytics module previously discussed, or the identify sentence boundaries module may retrieve the segment from the audio based on some type of markers identifying where in the audio the segment can be found. In addition, the identify sentence boundaries may be configured to receive or retrieve the words that have been previously identified and stored for the segment, along with the location/order for each word in the segment.

Next, the identify sentence boundaries module selects an inter-word boundary for the utterance segment in Operation 815. In various embodiments, this particular operation is performed by the identify sentence boundaries module selecting the inter-word boundaries in the order in which they appear in the utterance. An inter-word boundary is considered the space that occurs between two consecutive words found in the utterance segment.

Accordingly, the identify emotions module selecting the inter-word boundary may involve the module selecting the portion of the utterance segment that contains the inter-word boundary in various embodiments. For instance, in particular embodiments, the portion of the segment that contains the inter-word boundary may include the word immediately preceding and following the boundary, or alternatively with a window of frames before and after the boundary.

At this point, the identify sentence boundaries module retrieves lexical features for the word or window preceding the currently selected inter-word boundary in Operation 820. Here, in particular embodiments, the identify sentence boundaries module is configured to retrieve lexical information for the word or window preceding the inter-word boundary that includes word features, POS features, and class features. Accordingly, information may be provided along with the utterance segment on the location of inter-word boundaries within the segment and information that can be used to retrieve the lexical features from some type of memory for the boundaries.

For instance, in particular embodiments, the identify sentence boundaries module retrieves word features that include different lengths of n-grams (e.g., up to four) for the word $W_i$ preceding the currently selected inter-word boundary and different positional information for the location i where the word $W_i$ is present within the segment. In particular, the identify sentence boundaries module retrieves the word features: $<W_i>$; $<W_i, W_{i+1}>$; $<W_{i-1}, W_i>$; $<W_i, W_{i+1}, W_{i+2}>$; $<W_{i-2}, W_{i-1}, W_i>$; $<W_i, W_{i+1}, W_{i+2}, W_{i+3}>$; and $<W_{i-3}, W_{i-2}, W_{i-1}, W_i>$. In addition, the identify sentence boundary module in various embodiments retrieves the same type of information for POS features and class features The identify sentence boundaries module next retrieves prosodic features that are associated with the inter-word boundary in Operation 825. Again, information may be provided along with the utterance segment that can be used to retrieve such features. Here, in particular embodiments, the identify sentence boundaries module retrieves prosodic features reflecting pause durations, phone durations, and pitch information. As previously discussed, the pause features are extracted at the inter-word boundary, duration, frequency, and voice quality features are extracted mainly from the word or window preceding the boundary and pitch-related features reflecting the difference in pitch range are extracted across the boundary.

In particular embodiments, the identify sentence boundaries module may also include a non-prosodic feature, specifically the gender of the speaker. This information may be stored for the particular audio (e.g., the channel of the telephone conversation) and the identify sentence boundaries module simply retrieves the gender associated with the utterance segment. This particular feature may be included as a check to ensure the $F_0$ processing was normalized properly for gender difference.

Once the identify sentence boundaries module has retrieved all of the prosodic features for the currently-selected inter-word boundary, the module determines whether another inter-word boundary exists for the utterance segment in Operation 830. If so, then the identify sentence boundaries returns to Operation 815, selects the next inter-word boundary, and repeats the operations for retrieving the lexical and prosodic features for the newly-selected inter-word boundary.

Once the lexical and prosodic features have been retrieved for all the inter-word boundaries, then the identify sentence boundaries module applies a prosody model to the prosodic features in Operation 835. Accordingly, in various embodiments, the prosody model is some type of probabilistic classifier such as a neural network, exponential model, and naïve Bayes network. For instance, in particular embodiments, the prosody model is a decision tree.

Decision trees are probabilistic classifiers that given a set of discrete or continuous features and a labeled training set, the decision tree construction algorithm repeatedly selects a single feature that, according to an information-theoretic criterion (entropy), has the highest predictive value for the classification task in question. The feature queries are arranged in a hierarchical fashion, yielding a tree of questions to be asked of a given data point. The leaves of the tree store probabilities about the class distribution of all samples falling into the corresponding region of the feature space that serve as predictors for unseen samples. The decision tree serves as a prosody model for estimating the posterior probability of a sentence boundary at a given inter-word boundary, based on the extracted prosodic features.

During training, an iterative feature selection algorithm that involves running multiple decision trees is used to aid in reducing the candidate feature set to an optimal subset.

The entropy reduction of the overall tree after cross-validation is used as a criterion for selecting the best tree. Entropy reduction is the difference in test-set entropy between the prior class distribution and the posterior distribution estimated by the tree. Accordingly, the algorithm reduces the large number of initial candidate features by a leave-one-out procedure in which features that do not reduce performance when removed are eliminated from further consideration. Next, the algorithm performs a beam search over all possible subsets of features for the reduced number of features. Here, a set of core features such as pause duration are included in each subset to serve as catalysts for other features.

Accordingly, the identify sentence boundaries module applies the prosody model to the prosodic features extracted from the inter-word boundaries to produce posterior probabilities with respect to the likelihood of a sentence boundary being present at each of the inter-word boundaries. These posterior probabilities are then used along with the lexical features as input to a sentence boundary model.

Thus, the identify sentence boundaries module applies the sentence boundary model to the posterior probabilities and the lexical features in Operation 840. Here, depending on the embodiment, the sentence boundary model is some type of classifier such as a Hidden Markov model or a maximum entropy model. For instance, in particular embodiments, the sentence boundary model is a conditional random fields (CRFs) model. CRFs are a class of statistical modeling method often applied in machine learning and used for structured prediction. Whereas a discrete classifier predicts a class for a single sample without considering neighboring samples, a CRFs can take context into account and predict a sequence of classes for a sequence of input samples.

Here, a first-order model is used that includes only two sequential events in the feature set. $G_k$ are the feature functions, the index k represents different features, and $\lambda$ is the weight for a feature. $Z_\lambda$ is the normalization term: $Z_\lambda(W, F) = \Sigma_E \exp(\Sigma_k \lambda_k * G_k(E, W, F))$, where sequence E is conditioned on an observation sequence, consisting of the word sequence W and the prosodic features F. The model is trained to maximize the conditional log-likelihood of a given training set P(E|W, F), and the most likely sequence E is found using the Viterbi algorithm during testing. The posterior probabilities from the prosody model are encoded into several binary features through thresholding in a cumulative fashion with heuristically chosen thresholds to provide a more robust representation to the mismatch between the posterior probability in training and test sets.

Accordingly, the CRFs model provides a label sequence identifying which of the inter-word boundaries are sentence boundaries. At this point, the identify sentence boundaries module determines whether any sentence boundaries were found in the segment in Operation 845. If so, then the identify sentence boundaries module selects the words that make up the sentence in Operation 850. For example, the segment may include the words "that will save you five hundred dollars a year how does that sound." Accordingly, the identify sentence boundaries module processes this segment and determines two sentence boundaries exist in the segment as "That will save you five hundred dollars a year. How does that sound." Therefore, in this example, the identify sentence boundaries module would initially select "That will save you five hundred dollars a year" in Operation 850.

Next, the identify sentence boundaries module applies a question model to the sentence in Operation 855 to determine whether or not the sentence is a question. Similar to other models described herein, the question model is a classifier that predicts whether the sentence is a question or not. For instance, in particular embodiments, the classifier is a logistic regression model. The input to the model is the string of text that makes up the sentence. Accordingly, one hot encoding is used, as well as continuous embedding, during training in various embodiments to build a continuous bag of words. Continuous embedding allows for the capture of semantic meaning of the words. For instance, understanding the words "good" and "positive" are closer than the words "apricot" and "continent." Here, a third-party product may be used such as Word2vec. Word2vec is a group of related models that are used to produce word embeddings. These models are shallow, two-layer neural networks that are trained to reconstruct linguistic contexts of words.

Once the identify sentence boundaries module obtains the result of applying the question model to the current sentence, the module determines whether another sentence is present in the segment in Operation 860. If so, then the identify sentence boundaries module returns to Operation 850, selects the next sentence found in the segment, and repeats the operations to determine whether the newly-selected sentence is a question. The identify sentence boundaries module continues the process until a determination has been made for each of the sentences identified in the utterance segment as to whether the sentence is or is not a question. For instance, returning to the example, the identify sentence boundaries module would determine the first sentence in the utterance ("That will save you five hundred dollars a year.") is not a question and the second sentence in the utterance ("How does that sound?") is a question. At this point, the identify sentence boundaries module records the results for the utterance segment in Operation 865.

Exemplary Audio Recording Data Architecture

Figure 9:
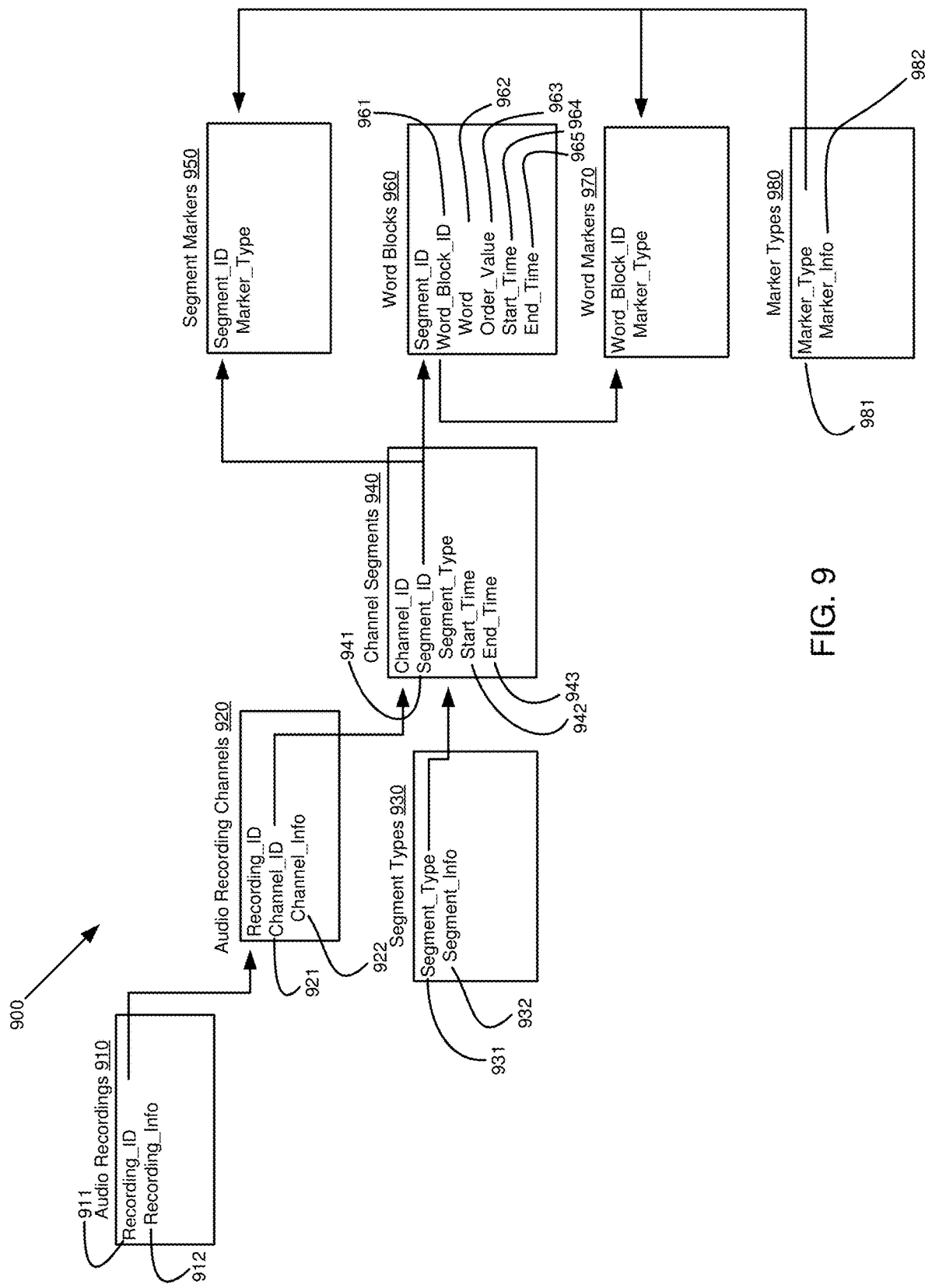
FIG. 9 illustrates a data architecture in accordance with various embodiments of the invention.

FIG. 9 provides a data architecture 900 for storing semantic and non-semantic characteristics (information) for an audio recording and associating various data elements for the characteristics in accordance with various embodiments of the invention. For instance, this particular architecture 900 may be utilized as a file structure or a database structure in particular embodiments. That is to say, the primary structures 910, 920, 930, 940, 950, 960, 970, 980 shown in FIG. 9 may be constructed as individual files or tables depending on whether a file structure or a database structure is used.

Looking at FIG. 9, the architecture 900 includes an Audio Recordings structure 910 configured to store information on an audio recording. For this particular configuration, the Audio Recordings structure 910 includes a recording identifier (Recording_ID 911) for each audio recording that uniquely identifies the recording. Accordingly, this identifier 911 can be used to retrieve, as well as associate, information stored in other data structures for the audio recording. The Audio Recordings structure 910 may also include Recording_Info 912 that provides general information about the audio recording such as, for example, the date and time the recording occurred and the reason for the audio recording taking place (e.g., a technical support call on a printer problem). Depending on the embodiment, the Recording_Info 912 may be separated out into multiple data elements (e.g., fields) and/or multiple structures for storage purposes. For example, in one embodiment, information on the parties involved in the audio recording may be stored in a separate data structure along with the recording's identifier 911 so that the information can be queried for the involved parties.

Similarly, the architecture includes an Audio Recording Channels structure 920 configured to store information on the different audio channels involved in the audio recordings. Here, the Audio Recording Channels structure 920 includes a channel identifier (Channel_ID 921) for each channel that uniquely identifies the channel for a recording. Similar to the recording identifier 911, the channel identifier 921 can be used to retrieve, as well as associate, information stored in other data structures for the channel. The Audio Recording Channels structure 920 may also include Channel_Info 922 that provides general information about the channel such as, for example, the speaker on the channel (e.g., the agent), recording quality of the channel, etc. Depending on the embodiment, the Channel_Info 922 may also be separated out into multiple data elements and/or multiple structures for storage purposes.

The next structure that makes up part of the data architecture 900 shown in FIG. 9 is a Channel Segments structure 940. The Channel Segments structure 940 stores a segment identifier (Segment_ID 941) for each segment for a channel that uniquely identifies the segment for a channel. Again, similar to the recording identifier 911 and the channel identifier 921, the segment identifier 941 can be used to retrieve, as well as associate, information stored in other data structures for the particular segment of the channel. In addition, the Channel Segments structure 940 includes a unique identifier (Segment_Type 931) for each type of segment that make up the audio for a channel. For instance, the audio for a channel may include utterance segments and noise segments. Therefore, the architecture 900 also includes a Segment Types structure 930 that defines the different types of segments. This structure 930 includes a unique identifier 931 for an utterance segment type and a unique identifier 931 or a noise segment type. In addition, the Segment Types structure 930 may store information (Segment_Ino 932) on the different segment types in multiple data elements and/or multiple structures depending on the embodiment.

Returning to the Channel Segments structure 940, the structure 940 further includes a start time (Start_Time 942) and an end time (End_Time 943) that identify where in the channel the particular segment occurs. Here, depending on the embodiment, other types of location information may be stored for a channel segment. For instance, in particular embodiments, the location information may include a start time and a duration to identify where in the channel the particular segment occurs. While in other embodiments, the location information may instead provide memory location information to identify where in the channel (where in the audio file for the channel) the particular segment occurs.

Continuing on, the next data structure that makes up the data architecture 900 shown in FIG. 9 is a Segment Markers structure 950. The Segment Markers structure 950 stores information on different markers associated with a particular segment of a channel. For example, an emotion may have been detected in a particular segment of a channel. Therefore, in this example, the Segment Markers structure 950 would include a record with the segment identifier 941 for the segment and an associated marker that identifies the particular emotion detected in the segment. Thus, the Segment Markers structure 950 includes a unique identifier (Marker_Type 981) for the type of marker associated with a particular segment. These markers are identified in the Marker Types structure 980.

Accordingly, the Marker Types structure 980 include a unique identifier (Marker_Type 981) for each type of marker that may be associated with a segment of a channel, as well as Marker_Info 982 on the marker type that may be stored in multiple data elements and/or multiple structures. For example, marker types may include one for each type of emotion that may be detected in a particular segment of an audio channel. In addition, a marker type may be defined for laughter.

As discussed herein, the words spoken in an utterance segment may be identified in various embodiments of the invention. Therefore, the data architecture 900 may include a Word Blocks data structure 960 for storing information on the words identified for a particular utterance segment. Here, the Word Blocks structure 960 includes a unique identifier (Word_Block_ID 961) that uniquely identifies a particular word in a segment. Again, the word identifier 961 can be used to retrieve, as well as associate, information stored in other data structures for the particular word of the segment. In addition, the Word Blocks structure 960 includes a field (Word 962) to store the particular word identified for the segment. Furthermore, the Word Blocks structure 960 includes a value (Order_Value 963) that identifies the order location for the particular word and a start time (Start_Time 964) and an end time (End_Time 965) identifying where in the segment the word occurs. Similar to the segments, other location information may be provided for a particular word in a segment depending on the embodiment.

Finally, the data architecture 900 shown in FIG. 9 includes a Word Markers data structure 970 that stores information on markers identified for particular words occurring in a segment. Here, the markers are generally associated with a sentence boundary that has been identified as following a particular word in a segment. Accordingly, the Word Markers structure includes the unique identifier (Word_Block_ID 961) for a particular word in a segment along with a unique identifier (Marker_Type 981) identifying the type of marker (e.g., the type of word boundary/punctuation) following the particular word.

Figure 10:
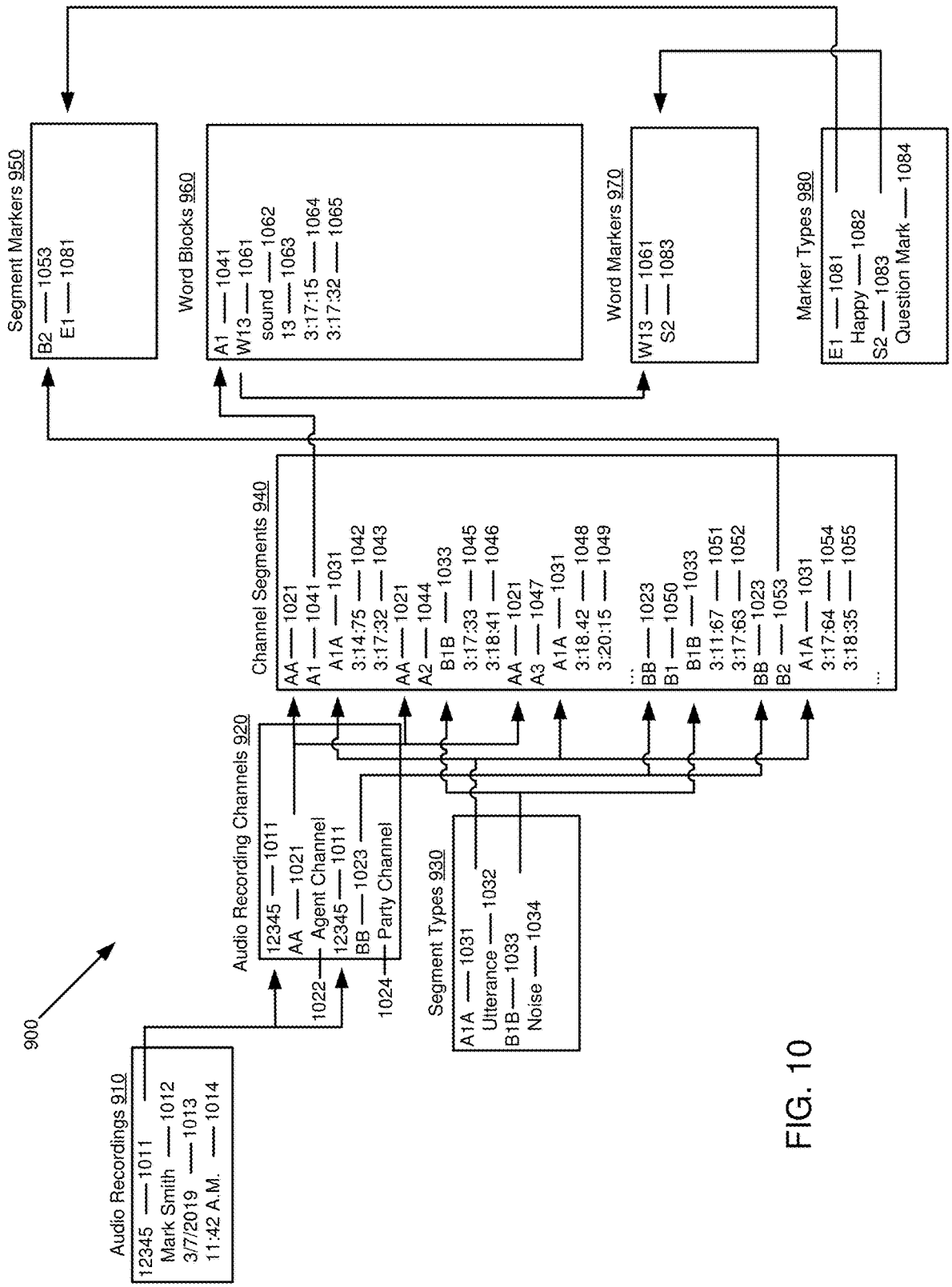
FIG. 10 illustrates an example of data stored in the data architecture for a conversation.

Turning now to FIG. 10, an example is provided of information saved in the data architecture 900 for a recorded audio. Accordingly, an entry is placed in the Audio Recordings structure 910 for the recorded audio that is associated with the identifier "12345" 1011. Here, audio recording entry also shows the recording involved a party named "Mark Smith" 1012 and occurred on "3/7/2019" 1013 at "11:42 A.M." 1014. In this example, the audio recording involves a telephone call received from Mark Smith at a contact center in which Mr. Smith was looking into signing up for a new auto insurance plan.

Here, the telephone call was conducted using two communication channels. A first channel for the agent who handled the call and a second channel for Mr. Smith. Therefore, the data architecture 900 stores this information in the Audio Recording Channels structure 920. The first entry in the Audio Recording Channels structure associated with the identifier "12345" 1011 for the audio recording is the agent's channel and has the identifier "AA" 1021. The channel information 1022 indicates the entry is the agent's channel. The second entry in the Audio Recording Channels structure associated with the identifier "12345" 1011 for the audio recording is the party's (Mark Smith's) channel and has the identifier "BB" 1023. For this entry, the channel information 1024 indicates the entry is the party's channel.

The Channel Segments structure 940 shows three segments associated with the agent's channel (associated with the agent's channel identifier "AA" 1021). The first segment of this channel has the identifier "A1" 1041 and has a segment type identifier of "AIA" 1031. Looking at the Segment Types structure 930, the segment type identifier "A1A" 1031 is an "Utterance" 1032. This particular utterance segment occurred during the telephone call at "3:14:75" 1042 and lasted until "3:17:32" 1043. Therefore, the segment is roughly three seconds long.

The second segment of the agent's channel has the identifier "A2" 1044. This particular segment has a segment type identifier of "B1B" 1033, which identifies the segment is "Noise" 1034 in the Segment Types structure 930, and occurred during the telephone call at "3:17:33" 1045 and lasted until "3:18:41" 1046. Accordingly, this particular segment represents a point during the telephone call in which the agent was not speaking. Finally, the third segment of the agent's channel shown in the Channel Segments structure 940 represents a segment in which the agent spoke (segment type identifier "A1A" 1031). This particular segment is associated with the identifier "A3" 1047 and occurred during the call at "3:18:42" 1048 and lasted until "3:20:15" 1049.

As for the party's channel, the Channel Segments structure 940 show two segments associated with this channel (associated with the party's channel identifier "BB" 1023). The first of these segments is associated with the identifier "B1" 1050 and has the segment type identifier of "B1B" 1033, indicating the segment is "Noise" 1034. This particular segment occurred during the call at "3:11:67" 1051 and lasted until "3:17:63" 1052. The second segment for the party's channel is associated with the identifier "B2" 1053. This particular segment has the segment type identifier of "A1A" 1031, indicating the segment is an "Utterance" 1032, and occurred during the call at "3:17:64" 1054 and lasted until "3:18:35" 1055.

Therefore, the five segments found in the Channel Segments structure 940 for the audio recording involving the party, Mark Smith, represent a total time of roughly eight seconds beginning at roughly three minutes and eleven seconds into the phone call. During this time, the agent spoke, then Mr. Smith spoke, followed by the agent speaking again. When one party was speaking, the other party was listening and not speaking. In other words, the five segments represent a portion of a conversation that took place between the agent and Mr. Smith speaking back and forth.

Figure 11:
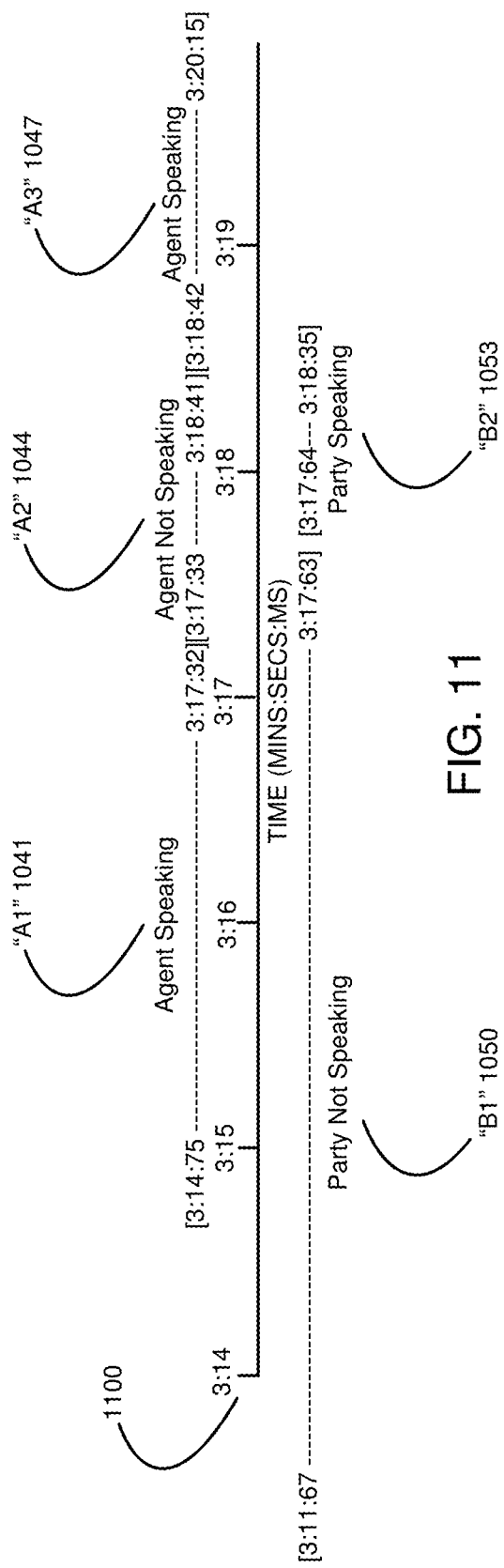
FIG. 11 illustrates an example of segments of an audio.

Turning briefly to FIG. 11, a timeline 1100 is shown with the five segments identified in the Channel Segments structure 940 for the telephone call. Here, the agent is speaking during the segment with identifier "A1" 1041 from "3:14:75" to "3:17:32." During this time, the party is not speaking, shown as the segment with identifier "B1" 1050. The party then speaks during the segment with identifier "B2" 1053 from "3:17:64" to "3:18:35." During this time, the agent is not speaking, shown as the segment with identifier "A2" 1044. Finally, the agent speaks again during the segment with identifier "A3" 1047. Accordingly, the segments from both of the channels for the telephone call represent a conversation taking place between the agent and the party, Mr. Smith, as they speak back and forth.

Returning to FIG. 10, semantic and non-semantic characteristics identified for the various segments may also be stored in the data architecture 900. Specifically, the Segment Markers structure 950 shows that a marker "E1" 1081 has been identified for the party's second segment (identifier "B2" 1053). The Marker Types structure 980 indicates this particular marker "E1" 1081 is the emotion "Happy" 1082. Accordingly, the party expressed the emotion happy during this particular utterance segment.

In addition, the Word Blocks structure 960 provides entries for the words spoken in each of the utterance segments. Here, the structure 960 includes an entry for the agent's first segment (identifier "A1" 1041). This entry is associated with the word identifier "W13" 1061 and is the word "sound" 1062. Furthermore, the entry indicates the word "sound" is the thirteen ("13" 1063) word spoken in the particular segment by the agent, occurring in the segment at "3:17:15" 1064 and lasting until "3:17:32" 1065. This particular word is associated with a marker, as shown in the Work Markers structure 970. Here, the word (identifier "W13" 1061) is associated with marker identifier "S2" 1083. The marker identifier "S2" is shown to represent a question mark 1084 in the Marker Types structure 980. Therefore, this particular marker indicates a question mark follows the word "sound" 1062 in the utterance segment. In other words, the agent asked the party, Mr. Smith, a question during the utterance segment.

Thus, the data architecture 900 shown in FIGS. 9 and 10 illustrates how an audio recording representing, for example, a telephone call conducted between an agent and a party for a particular purpose, is associated ("linked") to corresponding semantic and non-semantic characteristics. In addition, the data architecture 900 shown in these figures illustrates the various utterance and noise segments occurring for each channel of the recording and how such segments are constructed to represent the conversation that took place during the audio recording.

Exemplary Graphical User Interface

Figure 12:
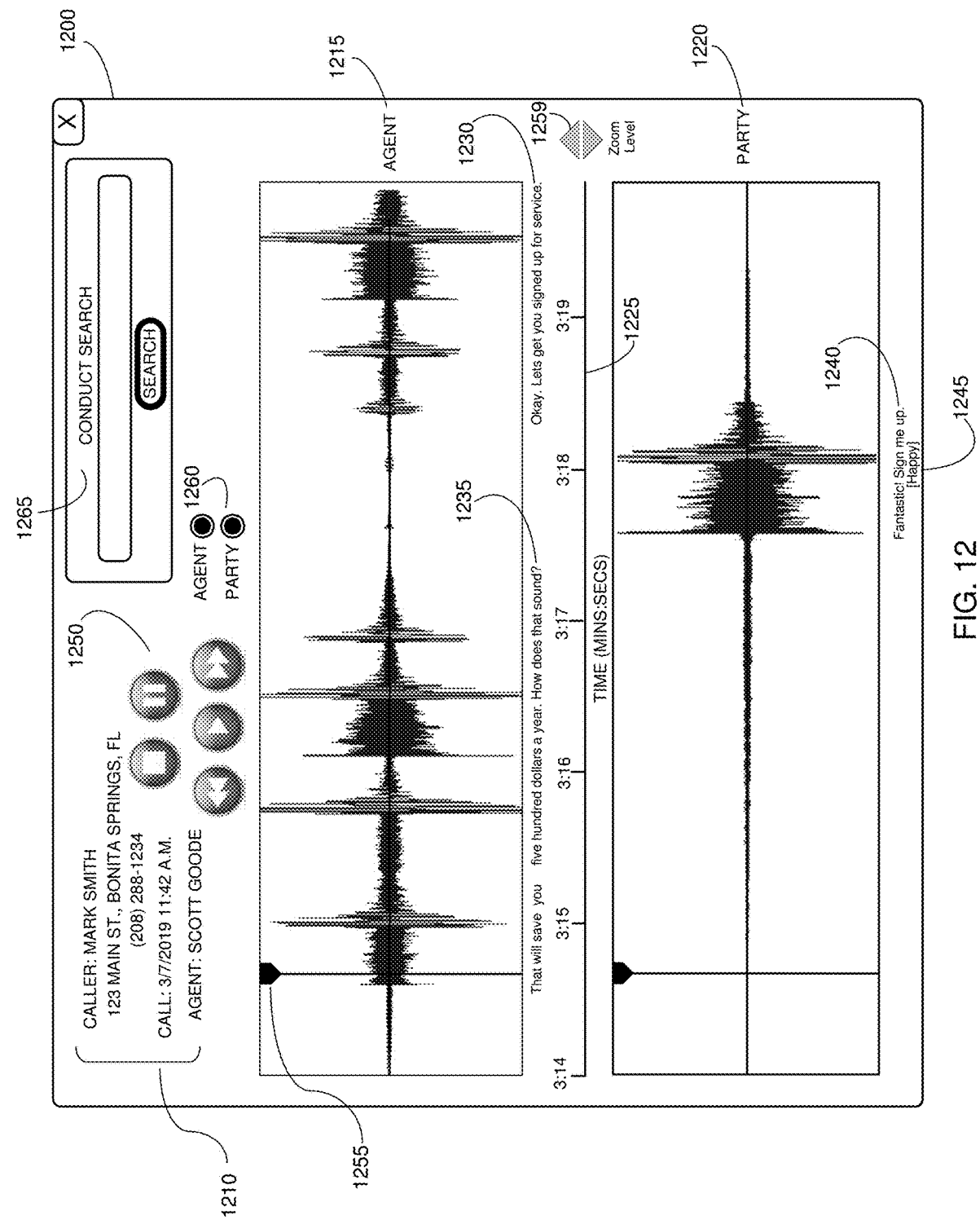
FIG. 12 show a graphical user interface for viewing an audio in accordance with various embodiments of the present invention.

An embodiment of a graphical user interface (GUI) 1200 provided for an audio recording is shown in FIG. 12. This particular embodiment shows the GUI 1200 generated for a communication conducted between a party and an agent. The upper-left portion of the GUI 1200 provides information 1210 about the particular communication. In this instance, the party/caller is identified as Mark Smith, who resides at 123 Main St., Bonita Springs, Fla. Further, the information 1210 indicates the communication was handle by agent Scott Goode and was received on Mar. 7, 2019 at 11:42 a.m.

In this instance, the GUI 1200 provides a representation 1215 of the agent's speech component, e.g., the agent's communication channel, and a representation 1220 of the party's speech component, e.g., the caller's communication channel. Between the two representations 1215, 1220, a timeline 1225 is provided indicating the minutes and seconds into the audio recording of the communication. The words spoken by the agent 1230 are shown along the bottom of the representation 1215 of the agent's speech component and the words spoken by the party 1240 are shown along the bottom of the representation 1220 of the party's speech component. In addition, zoom level controls 1259 are provided to allow the person reviewing the audio recording to zoom in or out to display a desired portion of the recording on the GUI 1200.

Here, non-semantic characteristics (information) are provided along with the words spoken for the agent and party. For instance, punctuation (sentence boundaries) has been added to the text. For example, a question mark 1235 has been added to indicate the agent was asking a question when he stated "How does that sound?" In addition, the party's text 1240 has been enhanced with "[Happy]" 1245 to indicate the party was expressing this emotion during the conversation. In particular embodiments, the GUI 1200 may be enhanced to further demonstrate non-semantic characteristics. For instance, the representation 1215, 1220 of the agent or party may be shown in a particular color to indicate where in the recording the agent or party expressed a certain emotion. For example, the agent's or party's representation 1215, 1220 may be shown in the color red to indicate an occurrence where the agent or party expressed anger.

Accordingly, this non-semantic characteristics provided on the GUI 1200 along with the text (semantic characteristics) adds enhanced meaning to what the agent and party were conveying during their conversation on the telephone call. That is to say, by providing these markers representing the non-semantic characteristics, the person who is using the GUI 1200 is able to gain a better understanding of the true meaning of what the agent and party were conveying during their conversation.

The GUI 1200 shown in FIG. 12 also includes controls 1250 at the top that can be used by the person reviewing the audio recording on the GUI 1200 to listen to the recording if desired. Here, the GUI 1200 provides a marker 1255 on each of the representations 1215, 1220 of the communication channels that indicates a position in the audio recording that the controls 1250 are currently set at so that if the person reviewing the recording were to select the play button from the controls 1250, the audio recording would begin playing from that position. In particular embodiments, the marker 1255 may be configured so that the person reviewing the audio recording can also simply drag the marker 1255 by using a mouse device to place the marker 1255 at a particular position in the recording.

In addition, the GUI 1200 provides selection controls 1260 that allows the person reviewing the audio recording to listen to either the agent's channel or the party's channel separately, or both channels at the same time. Here, the person can select the particular control 1260 for the agent or the party to listen that particular individual's channel, or the person can select both controls 1260 to listen to both individuals' channels as the same time.

Finally, the GUI 1200 shown in FIG. 12 provides a search component 1265 that allows for the person reviewing the audio recording to conduct searches on the audio recording. For instance, the search component 1265 may be configured in particular embodiments to allow the person to conduct a search for particular word(s) that appear (are spoken) in the audio recording. In these particular embodiments, the search component 1265 may search the text stored for the agent's channel, party's channel, or both channels of the audio recording to identify occurrences of the word(s) typed into the search field found on the component 1265. The results of the search may be provided on a popup screen that allows the person reviewing the audio recording to select a particular occurrence to automatically jump to that position in the recording.

In addition, the search component 1265 may be configured in particular embodiments to allow the person reviewing the audio recording to search for particular non-semantic characteristics associated with the audio recording. For instance, the component 1265 may be configured to allow the person to search for a particular emotion expressed by the agent and/or party. Here, the search component 1265 may be configured to recognize special syntax that indicates a search for a particular emotion. For example, an emotion enclosed in brackets ([Happy]) may indicate to the search component 1265 to search for occurrences in the audio recording where the agent and/or party expressed the emotion happy. Again, the search component 1265 may search the non-semantic characteristics stored for the agent's channel, the party's channel, or both channels of the audio recording to identify occurrences of the emotion typed into the search field found on the component 1265. Furthermore, the results of the search may be provided on a popup screen that allows the person reviewing the audio recording to select a particular occurrence to automatically jump to that position in the recording.

In other instances, the search component 1265 may be configured to allow the person reviewing the audio recording to search for occurrences of particular punctuation within the audio recording. For example, the person may wish to identify occurrences within the audio recording where the agent and/or party asked a question. Again, the component 1265 may be configured to recognize a particular syntax that indicates the person reviewing the audio recording is interested in identifying occurrences of certain punctuation in the recording. Furthermore, again, the search component 1265 may search the non-semantic characteristics stored for the agent's channel, the party's channel, or both channels of the audio recording to identify occurrences of the punctuation typed into the search field found on the component 1265 and the results of the search may be provided on a popup screen that allows the person reviewing the audio recording to select a particular occurrence to automatically jump to that position in the recording.

Exemplary Computer Processing Device

Figure 13:
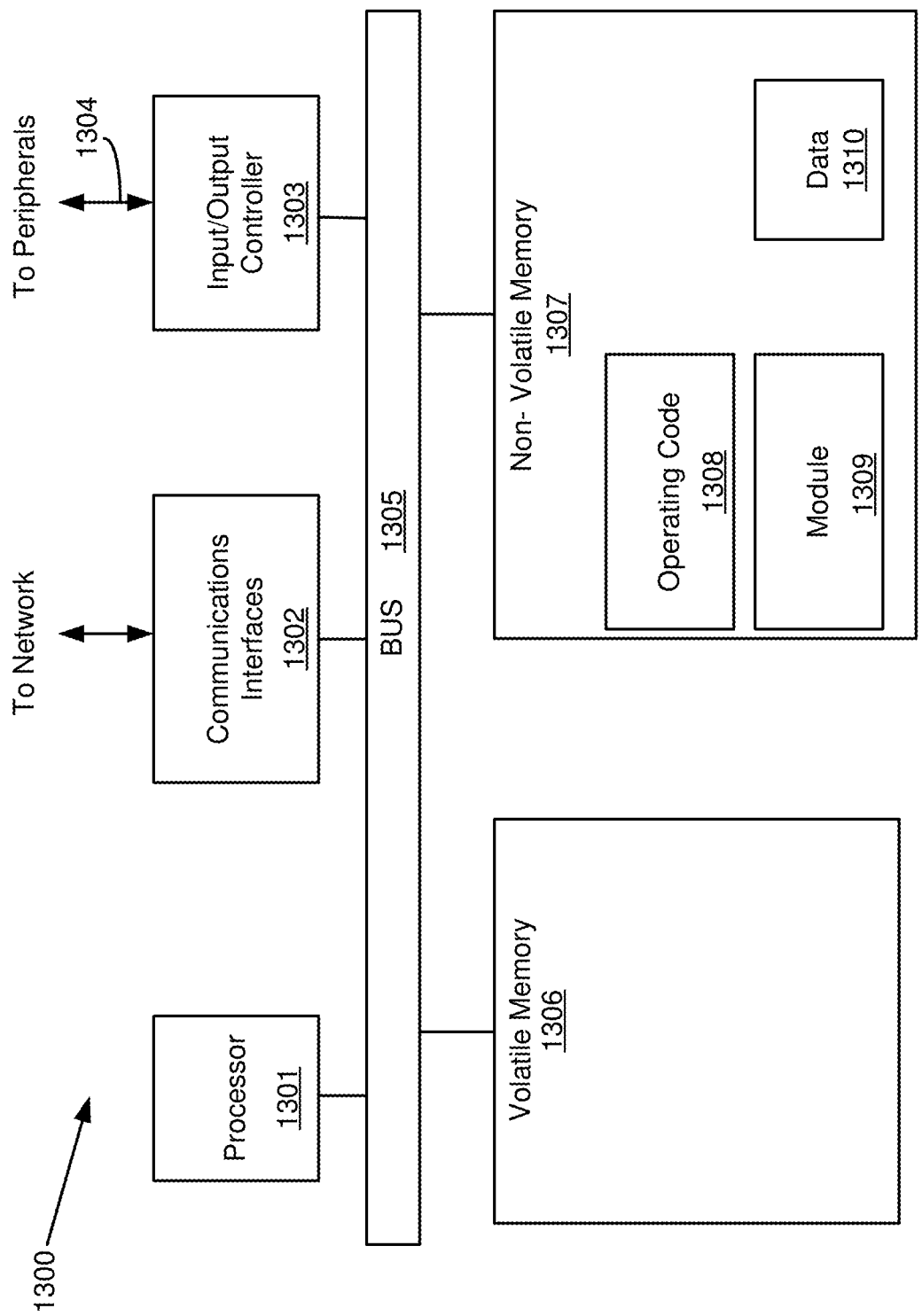
FIG. 13 illustrates an embodiment of a processing device for practicing various technologies and concepts disclosed herein.

FIG. 13 is an exemplary schematic diagram of a computer processing system that may be used in embodiments of various architectures, such as architecture 200 shown in FIG. 2, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 13, the processing system 1300 may include one or more processors 1310 that may communicate with other elements within the processing system 1300 via a bus 1305. The processor 1301 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1300 may also include one or more communications interfaces 1302 for communicating data via a network 270 with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1303 may also communicate with one or more input devices or peripherals using an interface such as, but not limited to: a keyboard, a mouse, a touch screen/display input, microphone, pointing device, etc. The input/output controller 1303 may also communicate with output devices or peripherals, such as displays, printers, speakers, headsets, banner displays, etc.

The processor 1301 may be configured to execute instructions stored in volatile memory 1306, non-volatile memory 1307, or other forms of computer readable storage media accessible to the processor 1301. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to:

storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1307 may store program code and data, which also may be loaded into the volatile memory 1306 at execution time. For example, the non-volatile memory 1307 may store one or more modules 1309 that may perform the process flows discussed herein and/or operating system code 1308 containing instructions for performing the process and/or functions associated with the technologies disclosed herein. The module(s) 1309 may also access, generate, or store related data 1311, including, for example, the extracted features and/or the semantic and non-semantic data (information) described above in conjunction with a particular audio recording, in the non-volatile memory 1307, as well as in the volatile memory 1306. The volatile memory 1306 and/or non-volatile memory 1307 may be used to store other information including, but not limited to: records, applications, programs, scripts, source code, object code, byte code, compiled code, interpreted code, machine code, executable instructions, or the like. These may be executed or processed by, for example, the processor 1310 and may form a part of, or may interact with, the module(s) 1309.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Technical Improvements

Although various embodiments of the invention are discussed herein with respect to providing a GUI to an individual to review contact center telephone conversations between remote parties and agents, the recognition of semantic and non-semantic characteristics in audio can be used for beneficial purposes in many other situations, both inside and outside a contact center environment. As previously noted, a benefit of capturing the semantic and non-semantic characteristics and corresponding relationships between these characteristics is obtaining a better comprehension of the meaning that is actually being conveyed by a party. Another way of stating this benefit is obtaining the ability to recognize (become aware of) the intention of the party. Such recognition can direct an individual's or machine's (e.g., a computer's) specific actions.

For instance, many contact centers make use of an interactive voice response systems, or IVRs. As previously noted, an IVR may collect and analyze responses from a party in the form of speech. For instance, an IVR may be used to identify the purpose of a call, such as, for example, prompting the party to enter account information or otherwise obtain information used to service the call. By identifying the purpose of a call, the IVR may then provide the party on the call with needed information (without involving an agent) or route the call appropriately. Here, the IVR's ability to identify the purpose of a call is paramount to the IVR taking the proper action. That is to say, the IVR's ability to identify the party's intention for the call is paramount to the IVR taking the proper action. Therefore, capturing the semantic and non-semantic characteristics of the call along with the corresponding relationships between the characteristics can enable the IVR to better identify the party's intention for the call.

For example, the IVR may be providing a party on a call with information on alternatives for handling an overdrawn account the party has with a bank. The party on the call may be listening to the options to handle the overdrawn account and may comment "wow that is just great." In this instance, the party may be expressing his or her approval of the options or disappointment in the options. However, with only the semantic characteristics (words) of the party's comment, the IVR would have to "guess" the party's true meaning in making the comment. Therefore, the IVR may incorrectly interpret the party's view of the options and as a result, the IVR may not handle the call by taking the most appropriate actions.

However, if the non-semantic characteristics were also provided along with the semantic characteristics, then the IVR may better identify what the party meant by the comment. For instance, if the non-semantic characteristic of the emotion anger was captured along with the comment, then the IVR may recognize the party is not particularly happy with the options for handling the overdrawn account. Therefore, in this instance, the IVR may route the call to an agent who can then converse with the party and help the party to come to a resolution that is more acceptable by the party. As a result, the party is more likely happier with the outcome in handling the overdrawn account.

Many other human-machine interactions outside of the contact center environment can benefit from the machines in the interactions gaining a better understanding of parties' intentions. A primary goal of many human-machine interfaces is to create a machine that can speak and understand speech as well as a human being. As already noted, a human being will use many other aspects apart from words during a conversation to convey information and accordingly, another human being listening will generally take all these additional aspects into consideration in processing a spoken phrase during the conversation to form a meaning of the phrase. Therefore, a machine that can also take all these additional aspects (non-semantic characteristics) into consideration in processing a spoken phrase from a human being can form a meaning of the phrase closer to that formed by another human being listening to the phrase. That is to say, the machine can gain a better understanding of the human being's intention from the phrase and as a result, the machine can comply with the recognized intention by adjusting its actions accordingly.

For instance, a specific area where the advantages provided by various embodiments of the invention may be recognized is in the area concerning the Internet of things. The Internet of things involves the extension of Internet connectivity into physical devices and everyday objects. For example, many home owners now make use of the Nest thermostat in their homes to control temperature. This device connects to the Internet to allow for a homeowner to control the device (e.g., adjust the temperature) over the Internet. Other such products exist in the home like refrigerators, light fixtures, vacuums, home security systems, and smart home devices such as Amazon's Echo® and Google. Home. As this area has grown in applications, the human voice is becoming a more common interface to use with such devices. Therefore, these devices' ability to recognize a human's intention from speech can play an important part in the successful performance of the devices. Thus, the ability to recognize and present semantic and non-semantic characteristics found in audio along with the corresponding relationships between these characteristics, as provided by various embodiments of the invention, help to enable these devices' ability to recognize a human's intention from speech.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for analyzing an audio to capture semantic characteristics and non-semantic characteristics of the audio and corresponding relationships between the semantic characteristics and the non-semantic characteristics comprising:
   segmenting the audio into a set of utterance segments and a set of noise segments by measuring one or more prosodic features of the audio to identify the set of utterance segments comprising segments of the audio containing a party speaking on the audio and the set of noise segments comprising segments of the audio containing the party not speaking on the audio;
   capturing the semantic characteristics and the non-semantic characteristics for each of the utterance segments in the set of utterance segments by:
      performing speech analytics on the utterance segment to identify words spoken by the party in the utterance segment;
      extracting lexical features with respect to each of the words spoken by the party in the utterance segment;
      extracting prosodic features across the utterance segment with respect to each of the words spoken by the party in the utterance segment and each inter-word boundary lying between two consecutive words spoken by the party in the utterance segment;
      performing laughter detection by:
         dividing the utterance segment into a set of overlapping windows comprising feature frames; and
         for each of the overlapping windows, using at least some of the prosodic features extracted at locations in the audio corresponding to each of the feature frames in the overlapping window as input to a first predictive model to identify whether laughter exists in the utterance segment;
      performing emotion detection by:
         comparing each of the words spoken by the party in the utterance segment to an emotion lexicon comprising a list of emotions and words that are indicative of one or more emotions in the list of emotions to identify a first result comprising one or more emotions in the list of emotions for at least one of the words spoken by the party in the utterance segment;
         using at least some of the prosodic features extracted for each of the words spoken by the party in the utterance segment as input to a second predictive model to identify a second result comprising one or more emotions expressed by the party in the utterance segment; and
         using the first result and the second result as input to an ensemble comprising a third predictive model to arrive at a conclusion as to which of the one or more emotions for the first result and the one or more emotions for the second result is the emotion expressed by the party in the utterance segment; and
      performing sentence boundary detection by using the lexical features and at least some of the prosodic features extracted for each of the words spoken by the party in the utterance segment and each of the inter-word boundaries lying between two consecutive words as input to a fourth predictive model to identify where in the utterance segment a sentence boundary exists with respect to each of the inter-word boundaries lying between two consecutive words; and
   constructing a transcript identifying the semantic characteristics as the words spoken by the party in the audio and the non-semantic characteristics as occurrences of laughter, emotions, and sentence boundaries and the corresponding relationships between the semantic characteristics and the non-semantic characteristics as locations of the words and the occurrences of laughter, emotions, and sentence boundaries within the audio relative to one another.

2. The method of claim 1 further comprising:
   segmenting a second audio into a set of utterance segments and a set of noise segments by measuring one or more prosodic features of the second audio to identify the set of utterance segments comprising segments of the second audio containing a second party speaking on the second audio and the set of noise segments comprising segments of the second audio containing the second party not speaking on the second audio;
   capturing semantic characteristics and non-semantic characteristics for each of the utterance segments in the set of utterance segments by:
      performing speech analytics on the utterance segment to identify words spoken by the second party in the utterance segment;
      extracting lexical features with respect to each of the words spoken by the second party in the utterance segment;
      extracting prosodic features across the utterance segment with respect to each of the words spoken by the second party in the utterance segment and each inter-word boundary lying between two consecutive words spoken by the second party in the utterance segment;

performing laughter detection by:
  dividing the utterance segment into a set of overlapping windows comprising feature frames; and
  for each of the overlapping windows, using at least some of the prosodic features extracted at locations in the second audio corresponding to each of the feature frames in the overlapping window as input to the first predictive model to identify whether laughter exists in the utterance segment;

performing emotion detection by:
  comparing each of the words spoken by the second party in the utterance segment to the emotion lexicon to identify a first result comprising one or more emotions in the list of emotions for at least one of the words spoken by the second party in the utterance segment;
  using at least some of the prosodic features extracted for each of the words spoken by the second party in the utterance segment as input to the second predictive model to identify a second result comprising one or more emotions expressed by the second party in the utterance segment; and
  using the first result and the second result as input to the ensemble to arrive at a conclusion as to which of the one or more emotions for the first result and the one or more emotions for the second result is the emotion expressed by the second party in the utterance segment; and performing sentence boundary detection by using the lexical features and at least some of the prosodic features extracted for each of the words spoken by the second party in the utterance segment and each of the inter-word boundaries lying between two consecutive words as input to the fourth predictive model to identify where in the utterance segment a sentence boundary exists with respect to each of the inter-word boundaries lying between two consecutive words;

constructing a second transcript identifying the semantic characteristics as the words spoken by the second party in the second audio and the non-semantic characteristics as occurrences of laughter, emotions, and sentence boundaries and the corresponding relationships between the semantic characteristics and the non-semantic characteristics as locations of the words and the occurrences of laughter, emotions, and sentence boundaries within the second audio relative to one another; and constructing a combined transcript comprising the first transcript and the second transcript, wherein the combined transcript represents a conversation that had taken place between the first party and the second party.

3. The method of claim 2 further comprising:
displaying the combined transcript on a graphical user interface ("GUI") on a computer monitor, the GUI comprising a timeline representing the conversation that had taken place between the first party and the second party;
displaying the semantic characteristics as the words spoken by the first party and the words spoken by the second party on the GUI at locations with respect to the timeline proximate to a time when the words spoken by the first party occurred and the words spoken by the second party occurred during the conversation; and
displaying the non-semantic characteristics for the first party and the second party as a plurality of markers on the GUI in conjunction with the timeline to demonstrate the corresponding relationships between the semantic characteristics and the non-semantic characteristics for the first party and the second party, wherein each of the markers represents an occurrence of laugher by the first party or the second party, an emotion expressed by the first party or the second party, or a sentence boundary for a sentence spoken by the first party or the second party, and each marker is displayed on the GUI at a location with respect to the timeline proximate to a time when the occurrence of laugher by the first party or the second party, the emotion expressed by the first party or the second party, or the sentence boundary for the sentence spoken by the first party or the second party took place during the conversation.

4. The method of claim 3, wherein the GUI identifies at least one of the first party and the second party as being associated with each marker.

5. The method of claim 1, wherein the first predictive model comprises one or more neural networks, the second predictive model comprises one or more support vector machines, the third predictive model comprises one or more multinomial logistic regression models, and the fourth predictive model comprises conditional random fields.

6. The method of claim 1 further comprising, for each sentence boundary detected in the utterance segment, using the words spoken by the first party that comprise a sentence associated with the sentence boundary as input to a fifth predictive model to identify whether the sentence associated with the sentence boundary is a question.

7. The method of claim 6, wherein the fifth predictive model comprises one or more logistic regression models.

8. A non-transitory, computer-readable medium comprising computer-executable instructions for analyzing an audio to capture semantic characteristics and non-semantic characteristics of the audio and corresponding relationships between the semantic characteristics and the non-semantic characteristics that when executed by at least one computer processor are configured to cause the at least one computer processor to:

segment the audio into a set of utterance segments and a set of noise segments by measuring one or more prosodic features of the audio to identify the set of utterance segments comprising segments of the audio containing a party speaking on the audio and the set of noise segments comprising segments of the audio containing the party not speaking on the audio;

to capture the semantic characteristics and the non-semantic characteristics for each of the utterance segments in the set of utterance segments:
  have speech analytics performed on the utterance segment to identify words spoken by the party in the utterance segment;
  extract lexical features with respect to each of the words spoken by the party in the utterance segment;
  extract prosodic features across the utterance segment with respect to each of the words spoken by the party in the utterance segment and each inter-word boundary lying between two consecutive words spoken by the party in the utterance segment;

to perform laughter detection:
divide the utterance segment into a set of overlapping windows comprising feature frames; and
for each of the overlapping windows, use at least some of the prosodic features extracted at locations in the audio corresponding to each of the feature frames in the overlapping window as input to a first predictive model to identify whether laughter exists in the utterance segment;

to perform emotion detection:
compare each of the words spoken by the party in the utterance segment to an emotion lexicon comprising a list of emotions and words that are indicative of one or more emotions in the list of emotions to identify a first result comprising one or more emotions in the list of emotions for at least one of the words spoken by the party in the utterance segment;
use at least some of the prosodic features extracted for each of the words spoken by the party in the utterance segment as input to a second predictive model to identify a second result comprising one or more emotions expressed by the party in the utterance segment; and
use the first result and the second result as input to an ensemble comprising a third predictive model to arrive at a conclusion as to which of the one or more emotions for the first result and the one or more emotions for the second result is the emotion expressed by the party in the utterance segment; and to perform sentence boundary detection:
use the lexical features and at least some of the prosodic features extracted for each of the words spoken by the party in the utterance segment and each of the inter-word boundaries lying between two consecutive words as input to a fourth predictive model to identify where in the utterance segment a sentence boundary exists with respect to each of the inter-word boundaries lying between two consecutive words; and construct a transcript identifying the semantic characteristics as the words spoken by the party in the audio and the non-semantic characteristics as occurrences of laughter, emotions, and sentence boundaries and the corresponding relationships between the semantic characteristics and the non-semantic characteristics as locations of the words and the occurrences of laughter, emotions, and sentence boundaries within the audio relative to one another.

9. The non-transitory, computer-readable medium of claim 8, wherein the computer-executable instructions cause the at least one computer processor to:

segment a second audio into a set of utterance segments and a set of noise segments by measuring one or more prosodic features of the second audio to identify the set of utterance segments comprising segments of the second audio containing a second party speaking on the second audio and the set of noise segments comprising segments of the second audio containing the second party not speaking on the second audio;

to capture semantic characteristics and non-semantic characteristics for each of the utterance segments in the set of utterance segments:
perform speech analytics on the utterance segment to identify words spoken by the second party in the utterance segment;
extract lexical features with respect to each of the words spoken by the second party in the utterance segment;
extract prosodic features across the utterance segment with respect to each of the words spoken by the second party in the utterance segment and each inter-word boundary lying between two consecutive words spoken by the second party in the utterance segment;

to perform laughter detection:
divide the utterance segment into a set of overlapping windows comprising feature frames; and
for each of the overlapping windows, use at least some of the prosodic features extracted at locations in the second audio corresponding to each of the feature frames in the overlapping window as input to the first predictive model to identify whether laughter exists in the utterance segment;

to perform emotion detection:
compare each of the words spoken by the second party in the utterance segment to the emotion lexicon to identify a first result comprising one or more emotions in the list of emotions for at least one of the words spoken by the second party in the utterance segment;
use at least some of the prosodic features extracted for each of the words spoken by the second party in the utterance segment as input to the second predictive model to identify a second result comprising one or more emotions expressed by the second party in the utterance segment; and
use the first result and the second result as input to the ensemble to arrive at a conclusion as to which of the one or more emotions for the first result and the one or more emotions for the second result is the emotion expressed by the second party in the utterance segment; and to perform sentence boundary detection:
use the lexical features and at least some of the prosodic features extracted for each of the words spoken by the second party in the utterance segment and each of the inter-word boundaries lying between two consecutive words as input to the fourth predictive model to identify where in the utterance segment a sentence boundary exists with respect to each of the inter-word boundaries lying between two consecutive words;

construct a second transcript identifying the semantic characteristics as the words spoken by the second party in the second audio and the non-semantic characteristics as occurrences of laughter, emotions, and sentence boundaries and the corresponding relationships between the semantic characteristics and the non-semantic characteristics as locations of the words and the occurrences of laughter, emotions, and sentence boundaries within the second audio relative to one another; and construct a combined transcript comprising the first transcript and the second transcript, wherein the combined transcript represents a conversation that had taken place between the first party and the second party.

10. The non-transitory, computer-readable medium of claim 9, wherein the computer-executable instructions cause the at least one computer processor to:
  display the combined transcript on a graphical user interface ("GUI") on a computer monitor for a user, the GUI comprising a timeline representing the conversation that had taken place between the first party and the second party;
  display the semantic characteristics as the words spoken by the first party and the words spoken by the second party on the GUI at locations with respect to the timeline proximate to a time when the words spoken by the first party occurred and the words spoken by the second party occurred during the conversation; and
  display the non-semantic characteristics for the first party and the second party as a plurality of markers on the GUI in conjunction with the timeline to demonstrate the corresponding relationships between the semantic characteristics and the non-semantic characteristics for the first party and the second party, wherein each of the markers represents an occurrence of laugher by the first party or the second party, an emotion expressed by the first party or the second party, or a sentence boundary for a sentence spoken by the first party or the second party, and each marker is displayed on the GUI at a location with respect to the timeline proximate to a time when the occurrence of laugher by the first party or the second party, the emotion expressed by the first party or the second party, or the sentence boundary for the sentence spoken by the first party or the second party took place during the conversation.

11. The non-transitory, computer-readable medium of claim 10, wherein the GUI identifies at least one of the first party and the second party as being associated with each marker.

12. The non-transitory, computer-readable medium of claim 8, wherein the first predictive model comprises one or more neural networks, the second predictive model comprises one or more support vector machines, the third predictive model comprises one or more multinomial logistic regression models, and the fourth predictive model comprises conditional random fields.

13. The non-transitory, computer-readable medium of claim 8, wherein the computer-executable instructions cause the at least one computer processor to, for each sentence boundary detected in the utterance segment, use the words spoken by the first party that comprise a sentence associated with the sentence boundary as input to a fifth predictive model to identify whether the sentence associated with the sentence boundary is a question.

14. The non-transitory, computer-readable medium of claim 13, wherein the fifth predictive model comprises one or more logistic regression models.

15. A system for analyzing an audio to capture semantic characteristics and non-semantic characteristics of the audio and corresponding relationships between the semantic characteristics and the non-semantic characteristics comprising:
  at least one computer processor configured to:
    segment the audio into a set of utterance segments and a set of noise segments by measuring one or more prosodic features of the audio to identify the set of utterance segments comprising segments of the audio containing a party speaking on the audio and the set of noise segments comprising segments of the audio containing the party not speaking on the audio; to capture the semantic characteristics and the non-semantic characteristics for each of the utterance segments in the set of utterance segments:
      have speech analytics performed on the utterance segment to identify words spoken by the party in the utterance segment;
      extract lexical features with respect to each of the words spoken by the party in the utterance segment;
      extract prosodic features across the utterance segment with respect to each of the words spoken by the party in the utterance segment and each inter-word boundary lying between two consecutive words spoken by the party in the utterance segment;
    to perform laughter detection:
      divide the utterance segment into a set of overlapping windows comprising feature frames; and
      for each of the overlapping windows, use at least some of the prosodic features extracted at locations in the audio corresponding to each of the feature frames in the overlapping window as input to a first predictive model to identify whether laughter exists in the utterance segment;
    to perform emotion detection:
      compare each of the words spoken by the party in the utterance segment to an emotion lexicon comprising a list of emotions and words that are indicative of one or more emotions in the list of emotions to identify a first result comprising one or more emotions in the list of emotions for at least one of the words spoken by the party in the utterance segment;
      use at least some of the prosodic features extracted for each of the words spoken by the party in the utterance segment as input to a second predictive model to identify a second result comprising one or more emotions expressed by the party in the utterance segment; and
      use the first result and the second result as input to an ensemble comprising a third predictive model to arrive at a conclusion as to which of the one or more emotions for the first result and the one or more emotions for the second result is the emotion expressed by the party in the utterance segment; and
    to perform sentence boundary detection:
      use the lexical features and at least some of the prosodic features extracted for each of the words spoken by the party in the utterance segment and each of the inter-word boundaries lying between two consecutive words as input to a fourth predictive model to identify where in the utterance segment a sentence boundary exists with respect to each of the inter-word boundaries lying between two consecutive words; and
    construct a transcript identifying the semantic characteristics as the words spoken by the party in the audio and the non-semantic characteristics as occurrences of laughter, emotions, and sentence boundaries and the corresponding relationships between the semantic characteristics and the non-semantic characteristics as locations of the words and the occurrences of laughter, emotions, and sentence boundaries within the audio relative to one another.

16. The system of claim 15, wherein the at least one computer processor is configured to:
segment a second audio into a set of utterance segments and a set of noise segments by measuring one or more prosodic features of the second audio to identify the set of utterance segments comprising segments of the second audio containing a second party speaking on the second audio and the set of noise segments comprising segments of the second audio containing the second party not speaking on the second audio;
to capture semantic characteristics and non-semantic characteristics for each of the utterance segments in the set of utterance segments:
perform speech analytics on the utterance segment to identify words spoken by the second party in the utterance segment;
extract lexical features with respect to each of the words spoken by the second party in the utterance segment;
extract prosodic features across the utterance segment with respect to each of the words spoken by the second party in the utterance segment and each inter-word boundary lying between two consecutive words spoken by the second party in the utterance segment;
to perform laughter detection:
divide the utterance segment into a set of overlapping windows comprising feature frames; and
for each of the overlapping windows, use at least some of the prosodic features extracted at locations in the second audio corresponding to each of the feature frames in the overlapping window as input to the first predictive model to identify whether laughter exists in the utterance segment;
to perform emotion detection:
compare each of the words spoken by the second party in the utterance segment to the emotion lexicon to identify a first result comprising one or more emotions in the list of emotions for at least one of the words spoken by the second party in the utterance segment;
use at least some of the prosodic features extracted for each of the words spoken by the second party in the utterance segment as input to the second predictive model to identify a second result comprising one or more emotions expressed by the second party in the utterance segment; and
use the first result and the second result as input to the ensemble to arrive at a conclusion as to which of the one or more emotions for the first result and the one or more emotions for the second result is the emotion expressed by the second party in the utterance segment; and
to perform sentence boundary detection:
use the lexical features and at least some of the prosodic features extracted for each of the words spoken by the second party in the utterance segment and each of the inter-word boundaries lying between two consecutive words as input to the fourth predictive model to identify where in the utterance segment a sentence boundary exists with respect to each of the inter-word boundaries lying between two consecutive words;
construct a second transcript identifying the semantic characteristics as the words spoken by the second party in the second audio and the non-semantic characteristics as occurrences of laughter, emotions, and sentence boundaries and the corresponding relationships between the semantic characteristics and the non-semantic characteristics as locations of the words and the occurrences of laughter, emotions, and sentence boundaries within the second audio relative to one another; and
construct a combined transcript comprising the first transcript and the second transcript, wherein the combined transcript represents a conversation that had taken place between the first party and the second party.

17. The system of claim 16, wherein the at least one computer processor is configured to:
display the combined transcript on a graphical user interface ("GUI") on a computer monitor for a user, the GUI comprising a timeline representing the conversation that had taken place between the first party and the second party;
display the semantic characteristics as the words spoken by the first party and the words spoken by the second party on the GUI at locations with respect to the timeline proximate to a time when the words spoken by the first party occurred and the words spoken by the second party occurred during the conversation; and
display the non-semantic characteristics for the first party and the second party as a plurality of markers on the GUI in conjunction with the timeline to demonstrate the corresponding relationships between the semantic characteristics and the non-semantic characteristics for the first party and the second party, wherein each of the markers represents an occurrence of laugher by the first party or the second party, an emotion expressed by the first party or the second party, or a sentence boundary for a sentence spoken by the first party or the second party, and each marker is displayed on the GUI at a location with respect to the timeline proximate to a time when the occurrence of laugher by the first party or the second party, the emotion expressed by the first party or the second party, or the sentence boundary for the sentence spoken by the first party or the second party took place during the conversation.

18. The system of claim 17, wherein the GUI identifies at least one of the first party and the second party as being associated with each marker.

19. The system of claim 15, wherein the first predictive model comprises one or more neural networks, the second predictive model comprises one or more support vector machines, the third predictive model comprises one or more multinomial logistic regression models, and the fourth predictive model comprises conditional random fields.

20. The system of claim 15, wherein the at least one computer processor is configured to, for each sentence boundary detected in the utterance segment, use the words spoken by the first party that comprise a sentence associated with the sentence boundary as input to a fifth predictive model to identify whether the sentence associated with the sentence boundary is a question.

21. The system of claim 20, wherein the fifth predictive model comprises one or more logistic regression models.

* * * * *